United States Patent
Kang et al.

(10) Patent No.: US 10,860,201 B2
(45) Date of Patent: Dec. 8, 2020

(54) FLEXIBLE DISPLAY APPARATUS

(71) Applicant: LG ELECTRONICS INC., Seoul (KR)

(72) Inventors: Shinnyue Kang, Seoul (KR); Jeongyun Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 15/767,948

(22) PCT Filed: Feb. 5, 2016

(86) PCT No.: PCT/KR2016/001345
§ 371 (c)(1),
(2) Date: Apr. 12, 2018

(87) PCT Pub. No.: WO2017/065361
PCT Pub. Date: Apr. 20, 2017

(65) Prior Publication Data
US 2018/0284964 A1  Oct. 4, 2018

(30) Foreign Application Priority Data
Oct. 13, 2015  (KR) .................. 10-2015-0143061

(51) Int. Cl.
*G06F 3/0486* (2013.01)
*G06F 3/0488* (2013.01)
(Continued)

(52) U.S. Cl.
CPC .......... *G06F 3/0486* (2013.01); *G06F 1/1626* (2013.01); *G06F 1/1652* (2013.01);
(Continued)

(58) Field of Classification Search
CPC .... G06F 3/0486; G06F 1/1626; G06F 1/1652; G06F 1/1677; G06F 1/3265;
(Continued)

(56) References Cited

U.S. PATENT DOCUMENTS 7,631,276 B2 * 12/2009 Gruen ................. G06F 3/04883
715/818
8,200,762 B2 *  6/2012 Staats ................. G06Q 10/107
709/206
(Continued)

FOREIGN PATENT DOCUMENTS

JP  2013-544410 A  12/2013
KR  10-2009-0030138 A  3/2009
(Continued)

*Primary Examiner* — Jung-Mu T Chuang
(74) *Attorney, Agent, or Firm* — Birch, Stewart, Kolasch & Birch, LLP

(57) ABSTRACT

A flexible display apparatus according to an embodiment of the present invention comprises: a display unit which displays information on a screen, wherein the display unit is configured to allow the screen to be enlarged or reduced; a sensing unit which detects the size of the screen; and a control unit which displays first information in a first area corresponding to a first distance on the screen of the display unit, enlarges the screen by a second area corresponding to a second distance, and displays, in the second area, second information that is associated with the first information in a time-series manner.

13 Claims, 33 Drawing Sheets

(51) Int. Cl.
*G06F 3/0346* (2013.01)
*G06F 1/16* (2006.01)
*G06F 1/3234* (2019.01)
*G09F 9/30* (2006.01)
*H04M 1/02* (2006.01)

(52) U.S. Cl.
CPC .......... *G06F 1/1677* (2013.01); *G06F 1/3265*
(2013.01); *G06F 3/0346* (2013.01); *G06F*
*3/0488* (2013.01); *G09F 9/301* (2013.01);
*H04M 1/0268* (2013.01); *G06F 2203/04102*
(2013.01); *G09G 2380/02* (2013.01)

(58) Field of Classification Search
CPC .............. G06F 3/0346; G06F 3/0488; G06F
2203/04102; G09F 9/301; H04M 1/0268;
G09G 2380/02
See application file for complete search history.

(56) References Cited

U.S. PATENT DOCUMENTS

| | | | | |
|---|---|---|---|---|
| 8,255,411 | B1* | 8/2012 | Carpenter | G06F 16/24539 707/764 |
| 8,413,059 | B2* | 4/2013 | Lee | H04L 51/32 709/206 |
| 8,443,303 | B2* | 5/2013 | Dunnam | G06F 3/04883 345/173 |
| 8,468,458 | B2* | 6/2013 | Lee | G06F 3/04883 715/745 |
| 8,510,664 | B2* | 8/2013 | Rueben | G06Q 10/00 709/206 |
| 8,666,455 | B2* | 3/2014 | Song | H04M 1/0268 455/566 |
| 8,843,572 | B2* | 9/2014 | Forstall | H04L 51/00 709/206 |
| 9,041,648 | B2* | 5/2015 | Lee | G06F 3/147 345/156 |
| 9,122,319 | B2* | 9/2015 | Kwak | G06F 3/0487 |
| 9,350,836 | B2* | 5/2016 | Song | H04M 1/0268 |
| 9,423,878 | B2* | 8/2016 | Lessing | G06F 3/0488 |
| 9,524,049 | B2* | 12/2016 | Yun | G06F 3/045 |
| 9,589,529 | B2* | 3/2017 | Kim | G06F 3/041 |
| 9,646,407 | B2* | 5/2017 | Lee | G06F 3/041 |
| 9,678,582 | B2* | 6/2017 | Kwak | G06F 3/0487 |
| 9,767,438 | B2* | 9/2017 | Mandel | G06Q 10/107 |
| 9,852,530 | B2* | 12/2017 | Buck | G06F 3/04845 |
| 10,120,458 | B2* | 11/2018 | Kwak | G06F 3/0487 |
| 10,235,037 | B2* | 3/2019 | Kim | G06F 3/041 |
| 10,298,734 | B2* | 5/2019 | Cho | G06F 1/1652 |
| 10,452,156 | B2* | 10/2019 | Kang | G06F 3/0485 |
| 10,503,381 | B2* | 12/2019 | Schrock | H04L 51/08 |
| 2008/0098402 | A1* | 4/2008 | Lee | G06F 9/451 718/104 |
| 2008/0150919 | A1* | 6/2008 | Kanamaru | G06F 3/1423 345/179 |
| 2008/0162649 | A1* | 7/2008 | Lee | H04L 51/32 709/206 |
| 2009/0023472 | A1* | 1/2009 | Yoo | H04M 1/27475 455/556.1 |
| 2009/0135215 | A1* | 5/2009 | Silverbrook | G06K 7/14 347/2 |
| 2009/0295976 | A1* | 12/2009 | Choi | H04N 5/23293 348/333.11 |
| 2010/0056223 | A1* | 3/2010 | Choi | G06F 1/1652 455/566 |
| 2010/0060548 | A1* | 3/2010 | Choi | H04M 1/0268 345/1.3 |
| 2010/0081475 | A1* | 4/2010 | Chiang | G06F 3/0483 455/564 |
| 2010/0117975 | A1* | 5/2010 | Cho | G06F 3/0416 345/173 |
| 2010/0141605 | A1* | 6/2010 | Kang | G06F 3/0412 345/174 |
| 2010/0162180 | A1* | 6/2010 | Dunnam | G06F 3/04883 715/863 |
| 2010/0164888 | A1* | 7/2010 | Okumura | G06F 3/04883 345/173 |
| 2010/0182265 | A1* | 7/2010 | Kim | G06F 1/1641 345/173 |
| 2010/0306228 | A1* | 12/2010 | Carpenter | G06F 16/3322 707/765 |
| 2011/0072363 | A1* | 3/2011 | Mandel | G06Q 10/107 715/752 |
| 2011/0083167 | A1* | 4/2011 | Carpenter | H04L 65/403 726/4 |
| 2011/0095975 | A1* | 4/2011 | Hwang | G06F 3/016 345/156 |
| 2011/0225249 | A1* | 9/2011 | Forstall | H04L 51/00 709/206 |
| 2012/0023416 | A1* | 1/2012 | Khoo | G06F 3/0482 715/752 |
| 2012/0166997 | A1* | 6/2012 | Cho | G06F 21/6218 715/778 |
| 2012/0212433 | A1* | 8/2012 | Lee | G06F 1/1652 345/173 |
| 2012/0236037 | A1* | 9/2012 | Lessing | G06F 3/0488 345/661 |
| 2012/0240054 | A1* | 9/2012 | Webber | G09G 5/38 715/752 |
| 2012/0240055 | A1* | 9/2012 | Webber | G06Q 10/107 715/752 |
| 2012/0290946 | A1* | 11/2012 | Schrock | G09G 5/14 715/752 |
| 2012/0329528 | A1* | 12/2012 | Song | G06F 3/048 455/566 |
| 2013/0125063 | A1* | 5/2013 | Lee | G06F 3/04883 715/854 |
| 2013/0201208 | A1* | 8/2013 | Cho | G06F 3/0488 345/619 |
| 2014/0035869 | A1* | 2/2014 | Yun | G06F 3/045 345/174 |
| 2014/0049464 | A1* | 2/2014 | Kwak | G06F 3/0487 345/156 |
| 2014/0098095 | A1* | 4/2014 | Lee | G06F 3/04815 345/420 |
| 2014/0187227 | A1* | 7/2014 | Song | G06F 3/048 455/418 |
| 2014/0218375 | A1* | 8/2014 | Kim | G06F 3/048 345/501 |
| 2014/0340299 | A1* | 11/2014 | Lee | G06F 1/1647 345/156 |
| 2015/0309316 | A1* | 10/2015 | Osterhout | G06F 3/0346 345/8 |
| 2015/0331496 | A1* | 11/2015 | Kwak | G06F 3/0487 345/156 |
| 2016/0274783 | A1* | 9/2016 | Schrock | H04M 1/72583 |
| 2017/0011210 | A1* | 1/2017 | Cheong | G06F 21/32 |
| 2017/0023978 | A1* | 1/2017 | Cho | H04M 1/0268 |
| 2018/0275770 | A1* | 9/2018 | Kang | G06F 3/0485 |

FOREIGN PATENT DOCUMENTS

| | | |
|---|---|---|
| KR | 10-2014-0017389 A | 2/2014 |
| KR | 10-2014-0135404 A | 11/2014 |
| KR | 10-2014-0146992 A | 12/2014 |

* cited by examiner

FIG. 2B
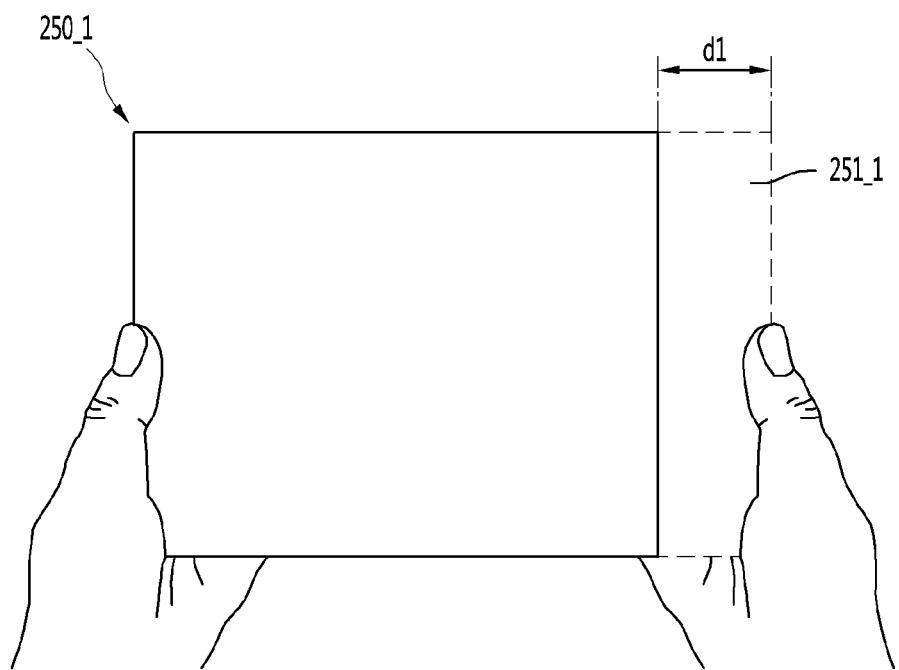
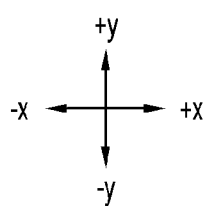

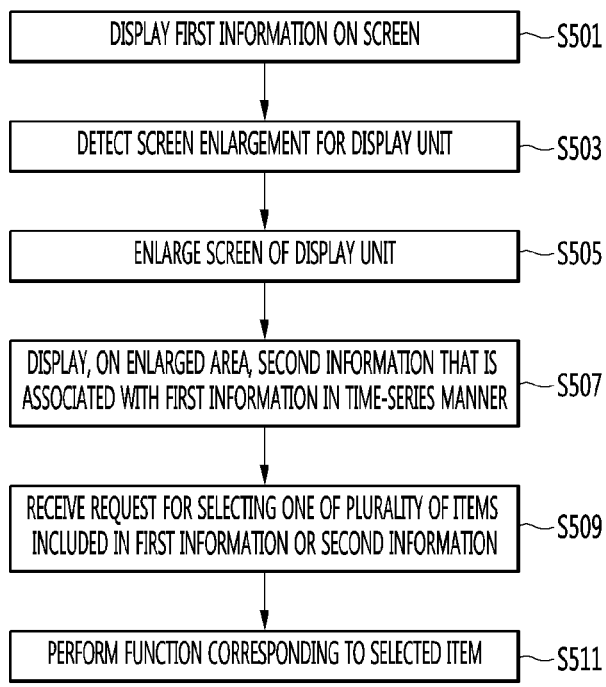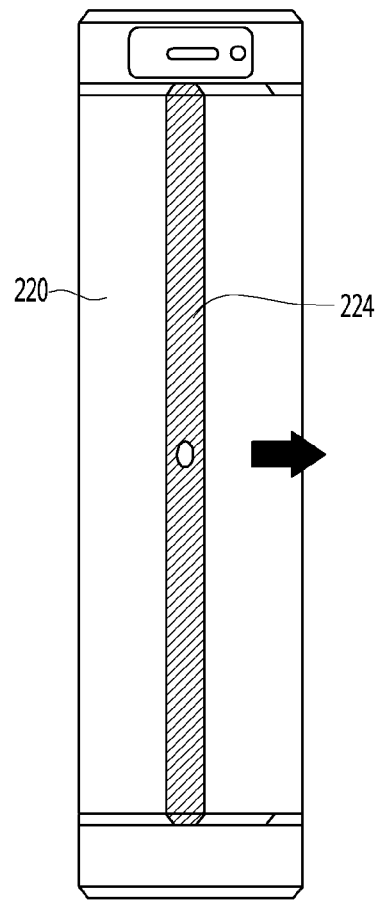

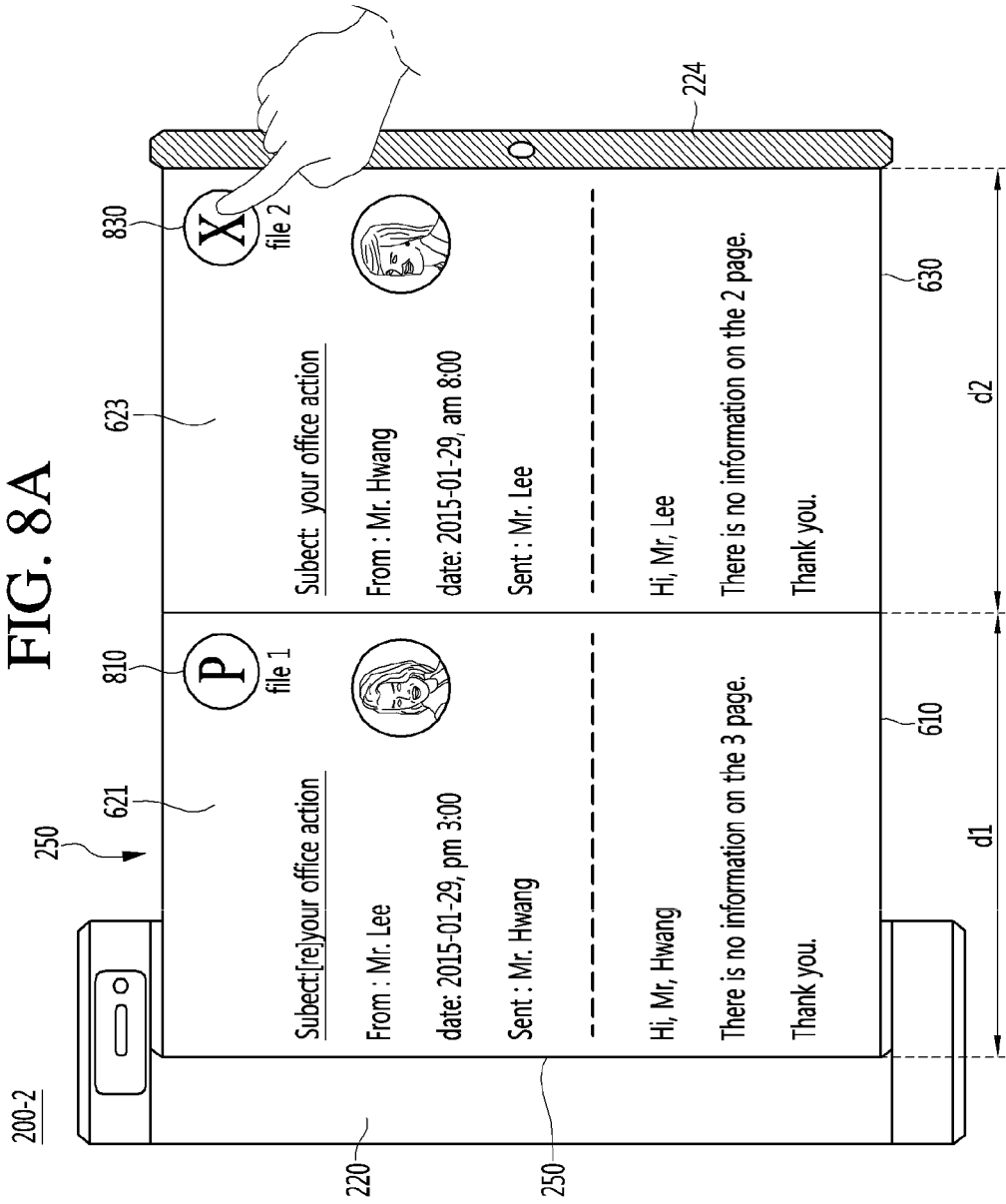

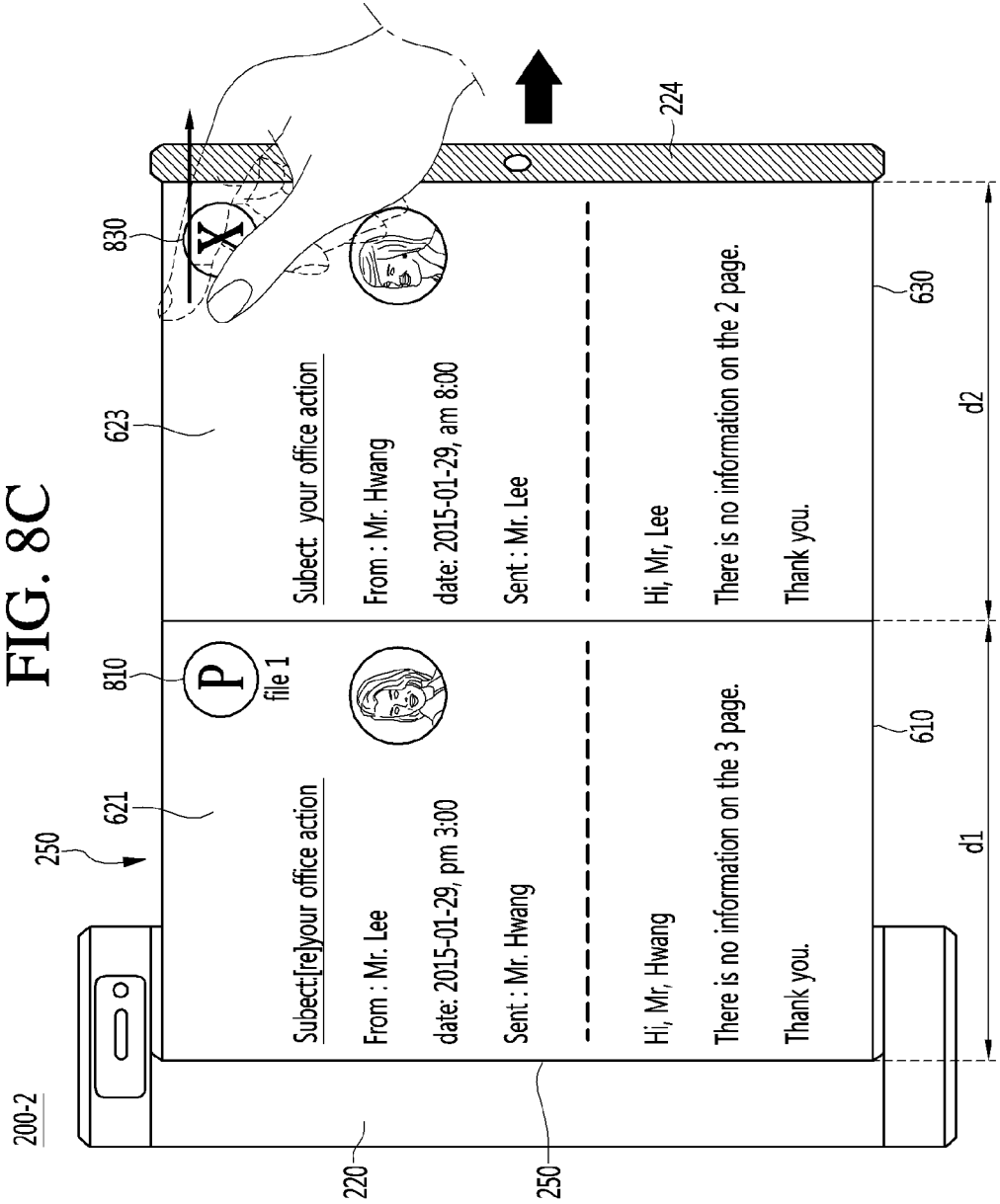

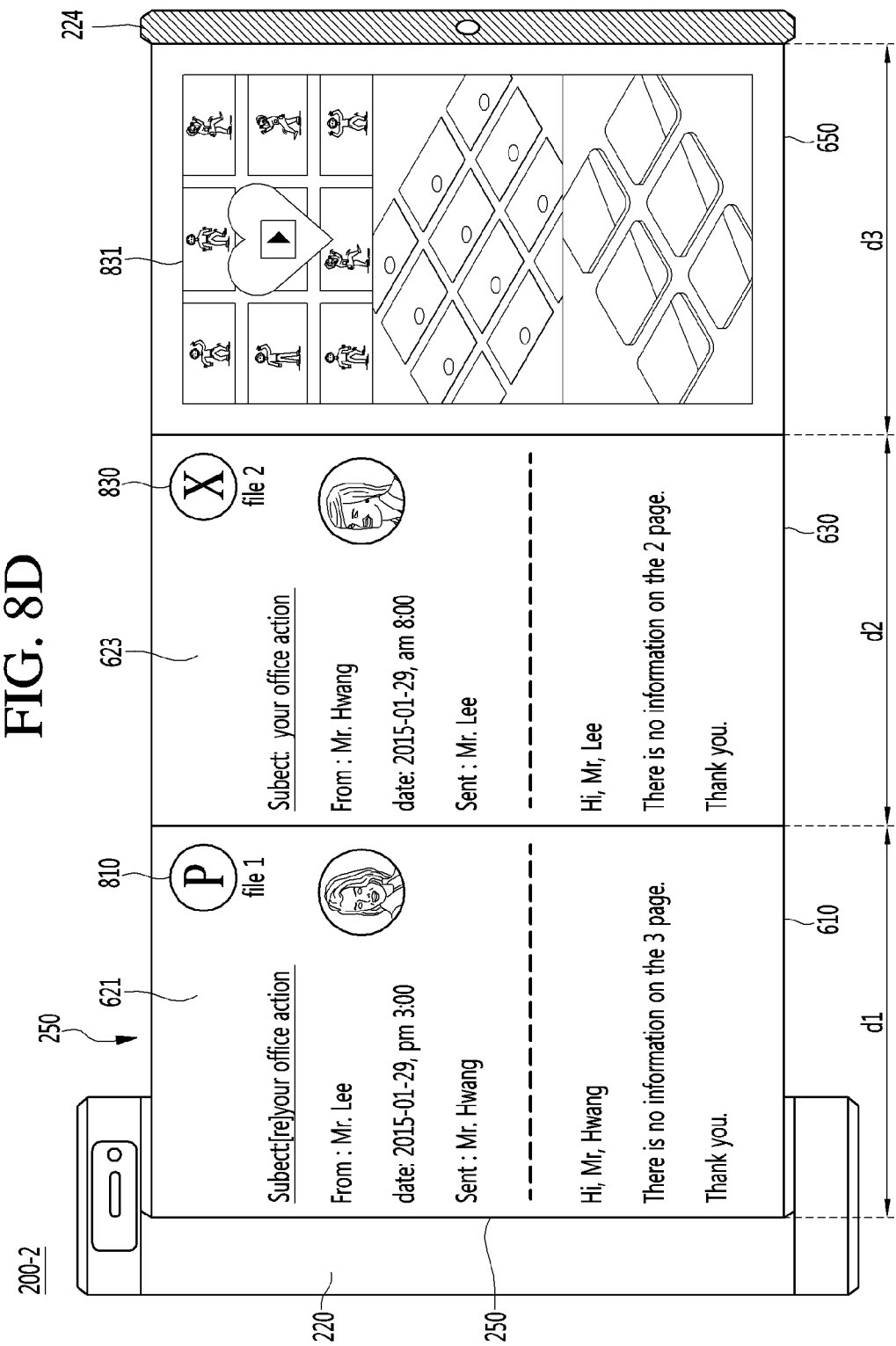

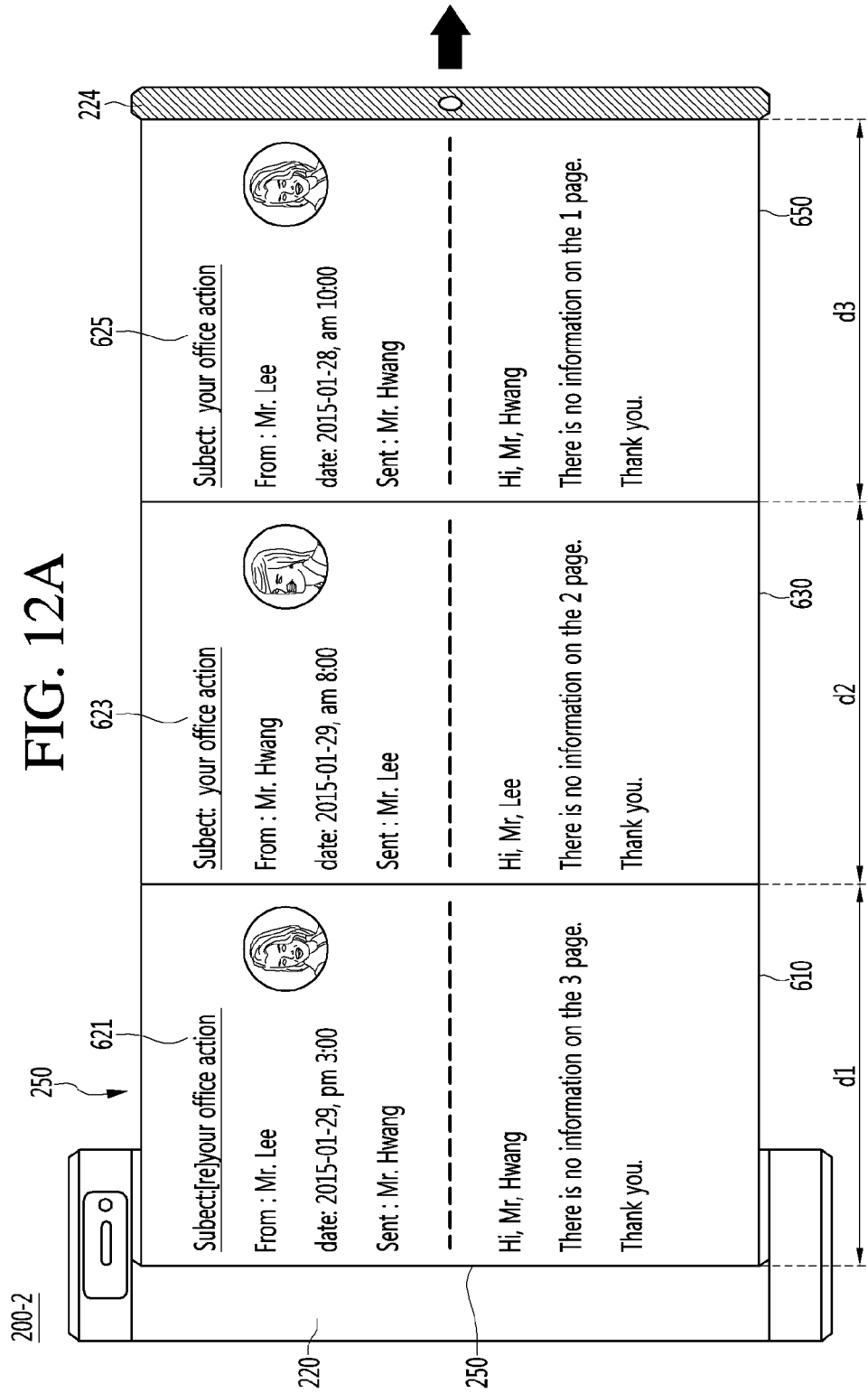

FLEXIBLE DISPLAY APPARATUS

CROSS-REFERENCE TO RELATED APPLICATIONS

This application is the National Phase of PCT International Application No. PCT/KR2016/001345, filed on Feb. 5, 2016, which claims priority under 35 U.S.C. 119(a) to Patent Application No. 10-2015-0143061, filed in the Republic of Korea on Oct. 13, 2015, all of which are hereby expressly incorporated by reference into the present application.

BACKGROUND OF THE INVENTION

Field of the Invention

The present invention relates to a flexible display device and an operating method thereof.

Discussion of the Related Art

With the development of a display technology, researches have been conducted to develop flexible display devices that can be rolled or can be stretched in at least one direction when being used. Such display devices can be variously changed in shape, and thus may satisfy both the requirement of a large-size screen at a stage of display use and the requirement of a compact display size for display portability.

Meanwhile, a flexible display device may be deformed into not only a predetermined shape but also various shapes depending on a user's intention or an environment in which the display device is used. Therefore, if a display area of the display device is fixed, a user may feel a sense of inconvenience.

SUMMARY OF THE INVENTION

Embodiments provide a flexible display device capable of being extended or reduced by a simple operation according to a request of a user.

Embodiments provide a flexible display device capable of providing information, which is associated with existing displayed information, to an expanded region of a screen.

According to an embodiment of the present invention, a flexible display device may include a display unit to display information on a screen, the screen being configured to be expanded or reduced, a sensing unit to sense a size of the screen, and a control unit to display first information on a first region corresponding to a first distance of the screen of the display unit, to expand the screen by a second region corresponding to a second distance, and to display, on the second region, second information time-series associated with the first information.

The second information may be information that transmitted or received, before the first information is received.

The first information may be a first mail received from a counterpart, and the second information may be a second mail sent to the counterpart by a user before the first mail is received.

Each of the first mail and the second mail includes at least one of an attached-file item for indicating presence of an attached file, a sender item for identifying a person who sends a mail, and a reply item for replying to the mail.

The control unit may receive a request for selecting an attached-file item included in the first mail and may display, on the second region, information on a preview of the attached-file time selected according to the received request.

The control unit may receive a request for selecting an attached-file item included in the second mail and may display information on a preview of the selected attached-file time on a third region corresponding to a third distance when the screen is expanded by the third region.

The control unit may receive a request to select a sender item included in the first mail and may display, on the second region, another mail sent by a sender corresponding to the sender item selected according to the received request.

The control unit may receive a request to select a reply item included in the first mail and displays, on the second region, a reply mail window for replying to a counterpart having sent the first mail, according to the received request.

The first mail may include an attached file, and the control unit may add the attached file to a reply mail window based on an input of dragging or dropping the attached file into the second region.

The control unit may sequentially display other pieces of information, which is not displayed, on the second region when expansion of the screen is detected after a screen size of the display unit is expanded to a maximum size.

The control unit may maintain first information to be displayed on the first region while sequentially displaying, on the second region, the other pieces of information which is not displayed.

The control unit may expand the screen by a third region corresponding to a third distance, and to display, on the third region, third information time-series associated with the second information.

The control unit may switch the second information, which is displayed on the second region, to the third information, when the third information is selected and the screen is reduced by the third area.

The control unit may select the third information when the third information is selected and reduction of the screen is detected.

The control unit may independently control the first region and the second region.

Advantageous Effects

As described above, according to various embodiments of the present invention, various pieces of information may be provided depending on the expansion degree of the screen size of the display unit, and thus the effect according to the demand of the user may be obtained.

In addition, the information associated with the existing displayed information is provided on the expanded region of the screen, and thus the user may conveniently use information.

BRIEF DESCRIPTION OF THE DRAWINGS

FIGS. 2A and 2B illustrate exemplary use of a stretchable display device that is a type of a flexible display device.

FIG. 5 is a flowchart illustrating an operating method of a flexible display device according to another embodiment of the present invention.

FIGS. 8A to 8D are views illustrating examples of providing a preview function of the attached file on an existing display region or an expanded display region according to the request to select the attached file item included in the mail.

FIGS. 12A and 12B are views illustrating an example of scrolling and displaying information positioned in a hidden region when a screen of the display unit is expanded to a maximum size and an input for expanding the screen is detected according to an embodiment of the present invention.

DETAILED DESCRIPTION OF THE EMBODIMENTS

Figure 1A:
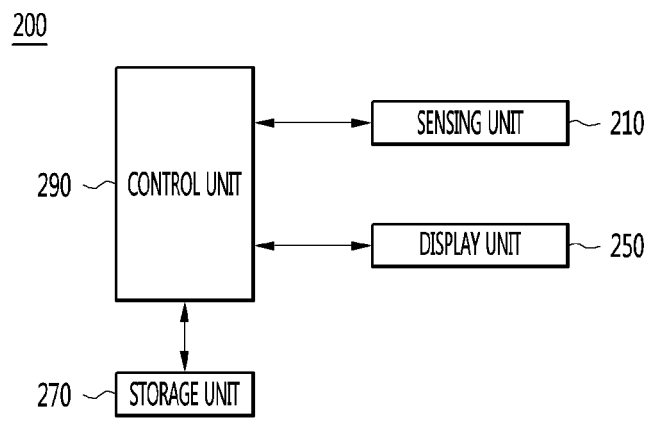
FIG. 1A is a block diagram illustrating a flexible display device according to an embodiment.

Embodiments of the present disclosure will be described in detail with reference to the accompanying drawings. Like reference numerals refer to like elements throughout, and overlapping descriptions are avoided. In the following description, the terms "module" and "unit" for referring to elements are given or used interchangeably in consideration of ease of description, and thus, the terms per se do not necessarily indicate different meanings or functions. Detailed descriptions of the related art are not provided so that the gist of the embodiments is not unnecessarily obscured. Furthermore, the accompanying drawings are provided only to assist with an understanding of the embodiments of the present disclosure and are not intended to limit the technical concept of the present disclosure, and should be construed as covering all modifications, equivalents or alternatives that fall within the spirit and technical scope of the present disclosure.

The term "first", "second" or the like may be used for describing various elements but does not limit the elements. Such terms are only used for distinguishing one element from other elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terms of a singular form may include plural forms unless otherwise specified.

It will be further understood that the terms "comprise", "comprising,", "include", "including", "have" and/or "having", when used herein, specify the presence of stated features, numbers, steps, operations, elements, components or combinations thereof, but do not preclude the presence or addition of one or more other features, numbers, steps, operations, elements, components or combinations thereof.

Figure 1B:
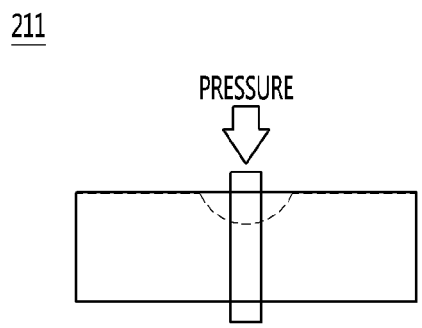
FIG. 1B is a diagram for describing a pressure sensor of a sensing unit.
Figure 1C:
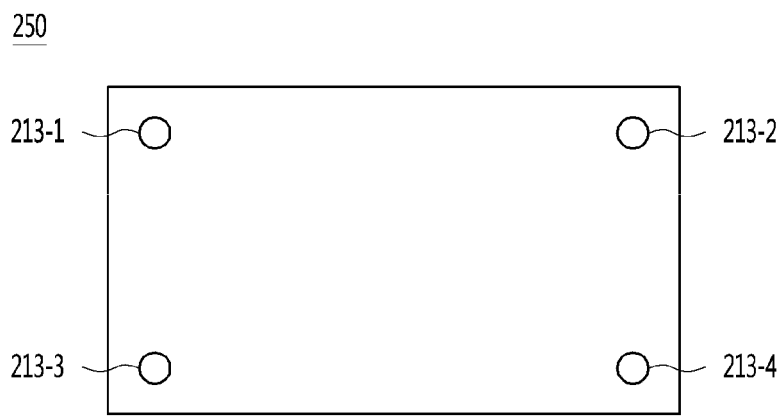
FIG. 1C is a diagram illustrating a display unit in which the sensing unit includes a plurality of acceleration sensors.

FIGS. 1A to 1C are diagrams illustrating a flexible display device according to an embodiment.

FIG. 1A is a block diagram illustrating a flexible display device 200 according to an embodiment, FIG. 1B is a diagram for describing a pressure sensor 211 of a sensing unit 210, and FIG. 1C is a diagram illustrating a display unit 250 in which the sensing unit 210 includes a plurality of acceleration sensors 213-1 to 213-4.

The flexible display device 200 according to an embodiment is a next-generation display device that is not only bendable but also stretchable and may be implemented in various and new environments, compared to typical display devices implemented using a rigid material such as glass, silicon, or the like.

In one embodiment, the flexible display device 200 may be a stretchable display device that is stretched when being pulled and recovers its original form when being released. If a certain period of time elapses while the flexible display device is being pulled and stretched, the flexible display device may be fixed in a stretched state. When a force is applied to the flexible display device, the flexible display device may contract to recover its original form.

In another embodiment, the flexible display device 200 may be a rollable display device that is able to be rolled or unrolled like paper.

Referring to FIG. 1A, the flexible display device 200 may include the sensing unit 210, the display unit 250, a storage unit 270, and a control unit 290.

The sensing unit 210 may detect extension or reduction of the display unit 250. The sensing unit 210 may detect a direction or strength of a force applied to the display unit 250.

In one embodiment, the sensing unit 210 may include at least one pressure sensor. The at least one pressure sensor may be disposed at the display unit 250. In the case where the sensing unit 210 includes at least one pressure sensor, each pressure sensor 211 may detect a change in resistance or capacitance between both ends of an area to which a pressure (or force) is applied as illustrated in FIG. 1B. The pressure sensor 211 may transfer, to the control unit 290, at least one of a capacitance change signal indicating a detected capacitance change or a resistance change signal indicating a detected resistance change. The capacitance change signal or the resistance change signal may include information on at least one of the strength or the direction of the force applied to the pressure sensor 211. The control unit 290 may obtain at least one of the strength or the direction of the force applied to the display unit 250, using the capacitance change signal or the resistance change signal received from the pressure sensor 211.

In another embodiment, the sensing unit 210 may include the plurality of acceleration sensors 213-1 to 213-4 as illustrated in FIG. 1C. In the case where the display unit 250 has a rectangular shape, each acceleration shape may be disposed adjacent to a vertex of a rectangle. In the case where the display unit 250 includes a flexible substrate and an image display unit, the acceleration sensors 213-1 to 213-4 may be arranged under the flexible substrate, and the image display unit may be disposed on the flexible substrate. However, this arrangement is merely an example, and the acceleration sensors 213-1 to 213-4 may be embedded in the flexible substrate or the image display unit.

The acceleration sensor serves to detect an intensity of impact or an acceleration of an object. A motion state of the display unit 250 may be accurately detected using the acceleration sensor. The acceleration sensor may sense the acceleration of the display unit 250 in three axial (x-axis, y-axis, z-axis) directions perpendicular to each other. The control unit 290 may obtain a moving speed using a tri-axial acceleration measured by the acceleration sensor. The control unit 290 may obtain a tri-axially extended distance of the display unit 250 using the obtained moving speed. The control unit 290 may obtain the strength and the direction of the force applied to the display unit 250, using the moving speed and distance obtained using the acceleration sensor. The control unit 290 may extend the display unit 250 according to the direction and the strength of the force.

In another embodiment, the sensing unit 210 may include a plurality of hall sensors. The plurality of hall sensors may be arranged inside the display unit 250 or on the display unit 250. In the case where the sensing unit 210 includes the plurality of hall sensors, the control unit 290 may extend or reduce the display unit 250 using voltage sensed by the hall sensors. In the case where the sensing unit 210 includes the hall sensors, an embodiment in which extension or reduction of the display unit 250 is detected using the hall sensors will be described with reference to FIGS. 3A to 3F.

The display unit 250 may be stretched in at least one direction. The display unit 250 may include a flexible substrate and an image display unit. The flexible substrate may be formed of polydimethylsiloxane (PDMS) and may be extended by a pulling force. The image display unit may be disposed on the flexible substrate, and may be extended together with the flexible substrate. The image display unit may display an image.

The display unit 250 may include an organic light-emitting diode (OLED).

The storage unit 270 may store the strength of a force applied to the display unit 250 and an extension degree or a reduction degree of the display unit 250 which corresponds to the strength of the force. The extension degree of the display unit 250 may indicate an extended length of the display unit 250, and the reduction degree of the display unit 250 may indicate a reduced length of the display unit 250.

The control unit 290 may detect extension or reduction of the display unit 250 via the sensing unit 210. The extension of the display unit 250 may indicate that a size of a screen able to be displayed by the display unit 250 is increased, and the reduction of the display unit 250 may indicate that the size of the screen able to be displayed by the display unit 250 is decreased. The control unit 290 may change a graphic or an image displayed on the screen according to the increase or decrease in the size of the screen of the display unit 250.

Furthermore, the control unit 290 may control overall operation of the flexible display device 200. Operation of the control unit 290 will be described in more detail later.

Figure 2A:
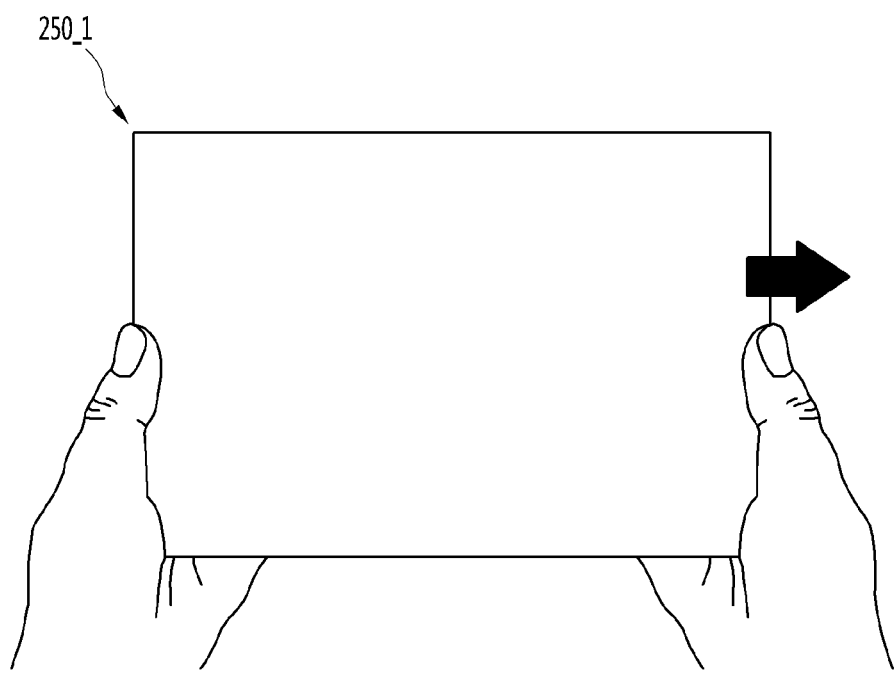

FIGS. 2A and 2B illustrate exemplary use of a stretchable display device that is a type of a flexible display device.

FIG. 2A illustrates a state of a display unit 250_1 before a stretchable display unit 200_1 is stretched. In this state, when a force is applied to the display unit 250_1 in a +x-axis direction, the control unit 290 may extend the display unit 250_1 by a distance of d1 in the +x-axis direction as illustrated in FIG. 2B. As the display unit 250_1 is extended, the display unit 250 may be extended by as much as an extended area 251_1 corresponding to the extended distance d1. That is, the screen size of the display unit 250 may be increased by as much as the extended area 251_1. FIG. 2 illustrates that the force is applied in the +x-axis direction, but this is merely an example. In the case where a force is applied to the display unit 250_1 in a −x-axis direction, the control unit 290 may allow the display unit 250_1 to recover its original size.

FIGS. 3A to 3F are diagrams illustrating a configuration and operation of a rollable display device which is a type of a flexible display device according to an embodiment.

Figure 3A:
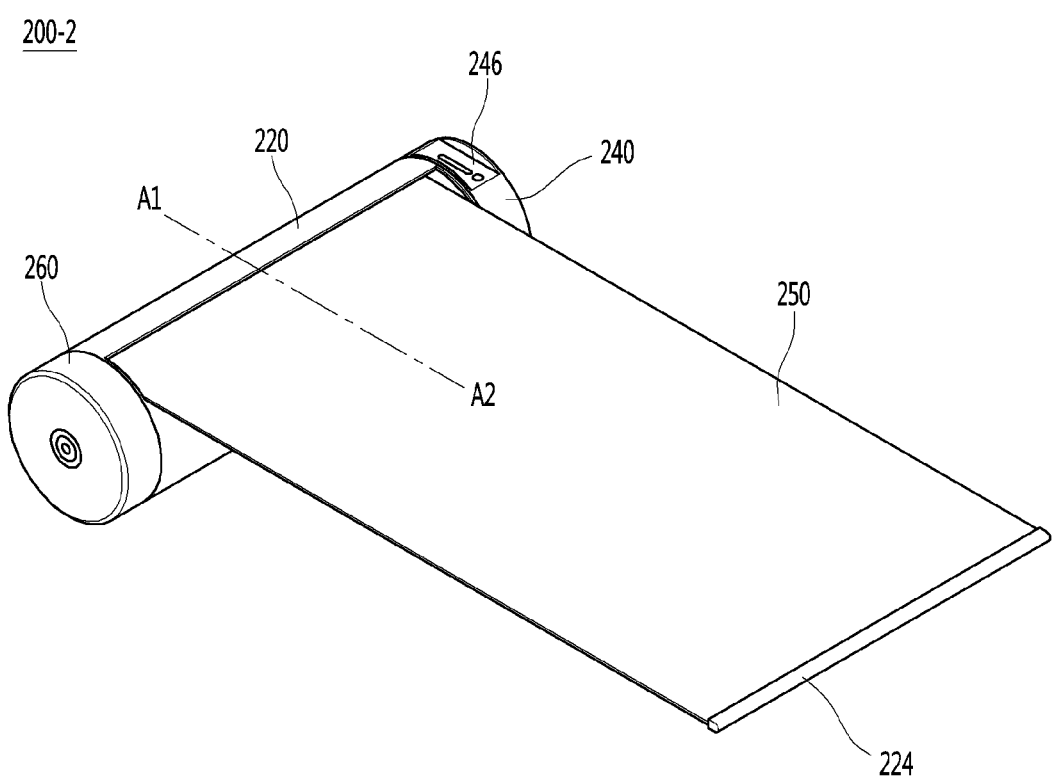
FIGS. 3A to 3F are diagrams illustrating a configuration and operation of a rollable display device which is a type of a flexible display device.
Figure 3B:
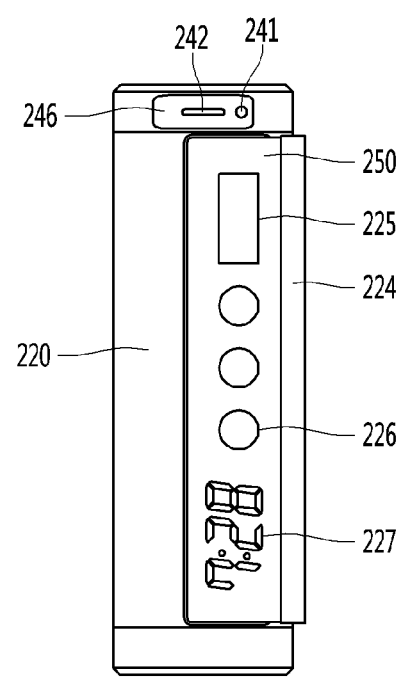
Figure 3C:
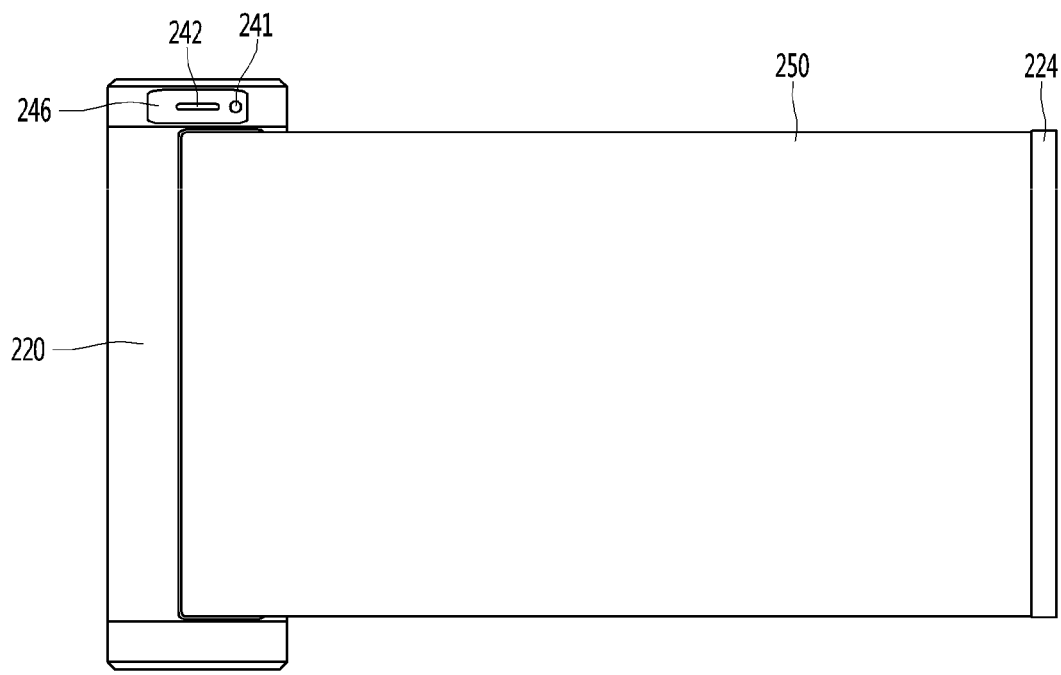
Figure 3D:
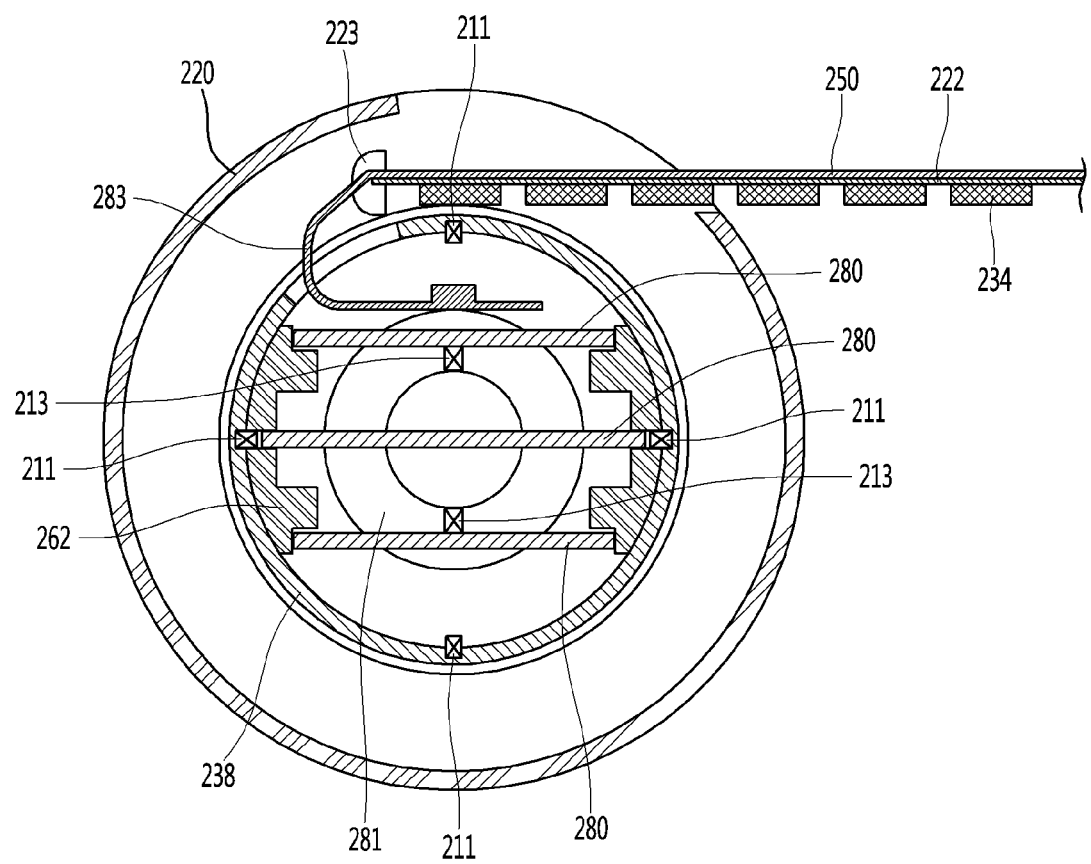
Figure 3E:
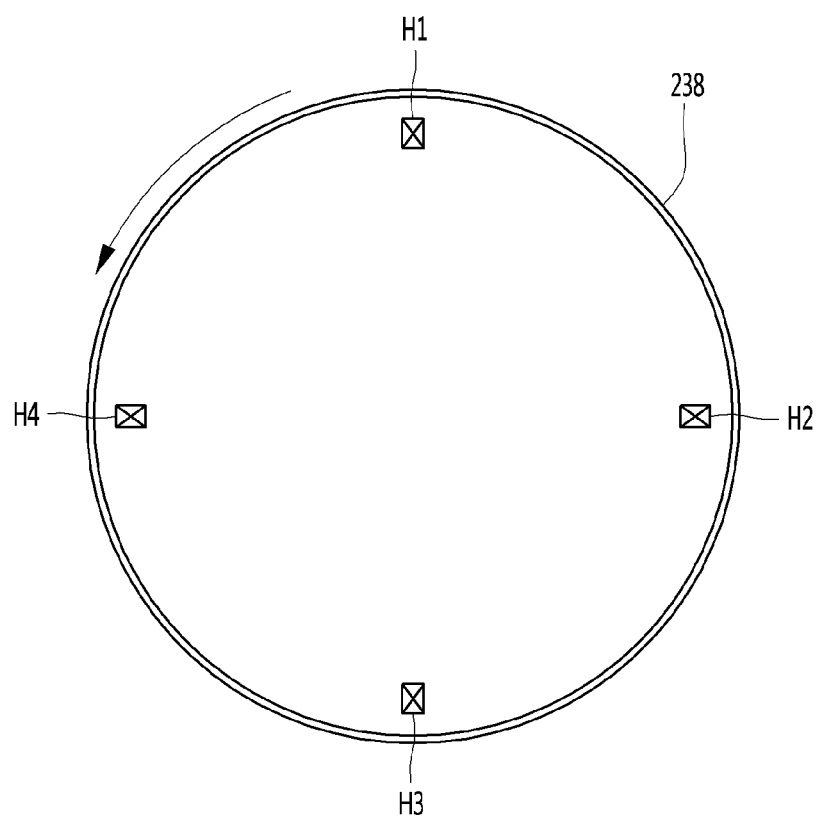
Figure 3F:
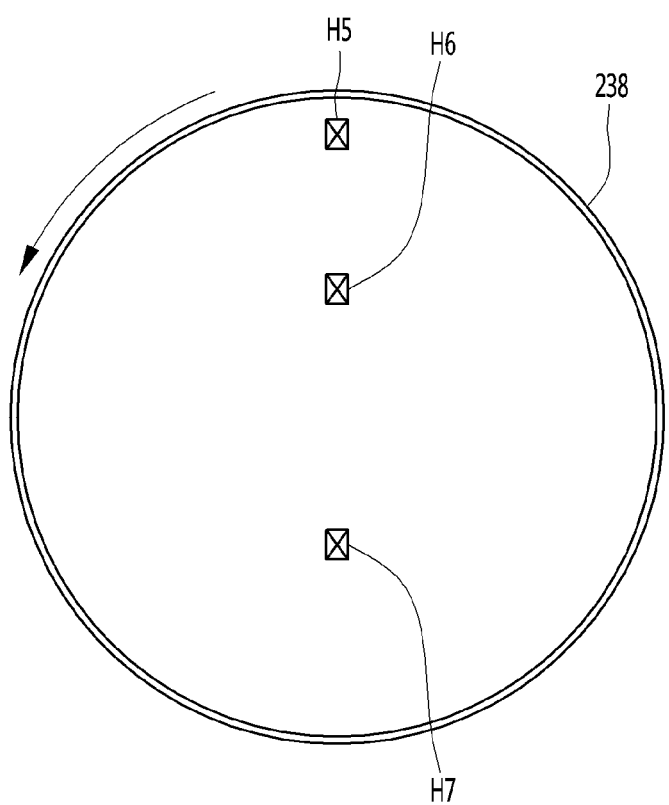

FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display unit using a hall sensor according to an embodiment.

Referring to FIGS. 3A to 3D, a rollable display device 200-2 may include an upper case 240, an intermediate case 220, a lower case 260, a display unit 250, a first holder 223, and a second holder 224.

The upper case 240, the lower case 260, and the intermediate case 220 form an exterior of the rollable display device 200-2. The intermediate case 220 may have a cylindrical shape, but is not limited thereto and may have various shapes such as a hexahedral shape. As illustrated in FIG. 3D, a part of the intermediate case 220 may be opened so as to expose a part of the display unit 250.

The upper case 240 and the lower case 260 may cover the intermediate case 220 at an upper side and a lower side thereof. The upper case 240 and the lower case 260 may not expose various components arranged inside the intermediate case 220. A recess part 246 may be formed in the upper case 240, wherein the recess part 246 may be recessed towards the inside of the upper case 240 so as to have a planar shape. At least one of a camera 241 or a sound output unit 242 may be disposed in the recess part 246. The first holder 223 (see FIG. 3D) may be provided to an end portion of one side of the display unit 250, and the second holder 224 may be provided to an end portion of another side of the display unit 250. The first holder 223 may prevent the display unit 250 from escaping from an inner side of the intermediate case 220 when a screen of the display unit 250 is maximally extended. The second holder 224 may prevent the display unit 250 from being rolled into the inner side of the intermediate case 220. A user may draw the second holder 224 in a specific direction to extend the screen of the display unit 250.

The display unit 250 may be rolled in towards the inner side of the intermediate case 220, or may be rolled out of the intermediate case 220. That is, the display unit 250 may be wound, rolled or coiled into the inner side of the intermediate case 220, or may be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

In a state in which the display unit 250 is not deformed (e.g., a state of having an infinite radius of curvature, hereinafter referred to as the first operation state), a region displayed by the display unit 250 may be a plane. In a state in which the display unit 250 is deformed by an external force in the first operation state (e.g., a state of having a finite radius of curvature, hereinafter referred to as the second operation state), a region displayed by the display unit 250 may be a curved surface. As illustrated in the drawings, information displayed in the second operation state may be time information output to the curved surface. Such time information may be implemented by individually controlling light emission of sub-pixels arranged in a matrix.

In the first operation state, the display unit 250 may not be flat but curved (e.g., vertically or horizontally curved). In this case, when an external force is applied to the display unit 250, the display unit 250 may be deformed to be flat (or less curved) or more curved.

The display unit 250 may be combined with a touch sensor to implement a flexible touch screen. When the flexible touch screen is touched, a control unit 290 may perform control corresponding to the touch input. The flexible touch screen may detect a touch input not only in the first operation state but also in the second operation state.

The rollable display device 200-2 according to an embodiment may be provided with a deformation detecting unit for detecting deformation of the display unit 250. The deformation detecting unit may be included in the sensing unit 210 (see FIG. 1A).

The deformation detecting unit may be provided to the display unit 250 or the intermediate case 220 so as to detect information on deformation of the display unit 250. Here, the information on deformation may include a deformation direction, a deformation degree, a deformation portion, or a deformation time of the display unit 250 or an acceleration of recovery of the display unit 250 deformed, or may additionally include various pieces of information detectable due to warpage of the display unit 250.

Furthermore, the control unit 290 may change information displayed on the display unit 250 or may generate a control signal for controlling a function of the rollable display device 200-2, on the basis of the information on deformation of the display unit 250 detected by the deformation detecting unit.

In an embodiment, the first operation state of the rollable display device 200-2 represents an inactive state in which a minimum display region is exposed to the outside so that basic information alone is displayed. The second operation state of the rollable display device 200-2 represents an active state in which the display unit 250 is extended. Extending of the display unit 250 may indicate that a screen displayed by the display unit 250 is extended. This extending includes gradational extending. A display region of the rollable display device 200-2, which is extended or reduced by rolling the display unit 250, may be implemented at one time at the moment of the extending or reducing, or the display region may be gradually extended or reduced. Therefore, hereinafter all states excepting the first operation state may be regarded as the second operation state, and the second operation state may be classified into a plurality of stages according to a degree of extension.

As illustrated in FIG. 3B, only regions such as a message window 225, an icon 226, or a time display part 227 may be displayed to minimize an exposed region of the display unit 250 in the first operation state. However, in the second operation state, the exposed region of the display unit 250 may be maximized to display information on a larger screen as illustrated in FIG. 3C. It is assumed that FIG. 3C illustrates a state in which the display unit 250 is maximally extended in some cases.

The control unit 290 (see FIG. 1A) may detect an unwound length of the display unit 250, and may turn on/off a part of the display unit 250 on the basis of the unwound length. For example, the control unit 290 may obtain a length of the display unit 250 unwound out of an opened region of the intermediate case 220. The control unit 290 may turn off the display unit 250 disposed inside the intermediate case 220, and may turn on the display unit 250 unwound out of the opened region of the intermediate case 220. Turning on a part of the display unit 250 may represent that power is applied so that the part of the display unit 250 displays information, and turning off a part of the display unit 250 may represent that power is not applied so that the part of the display unit 250 does not display information. Accordingly, since a part of the display unit 250 which is not unwound out of the intermediate case 220 is turned off, unnecessary power consumption and heating may be prevented.

Furthermore, when the display unit 250 is separated from an outer circumferential surface of an inner case 238, the control unit 290 may turn on a separated part of the display unit 250 and may turn off a non-separated part of the display unit 250. The control unit 290 may detect that the display unit 250 is separated from the outer circumferential surface of the inner case 238 using a length sensing unit 211 disposed in an inner circumferential surface of the inner case 238, so as to turn on the separated part of the display unit 250 and turn off the non-separated part of the display unit 250.

Referring to FIG. 3D, a shaft 281, the inner case 238, the length sensing unit 211, a rotation amount sensing unit 213, a plurality of circuit boards 280, a flexible circuit board 283, and a support frame 262 may be arranged in the intermediate case 220.

The shaft 281 may be rotated as the inner case 238 rotates.

The inner case 238 may be shaped like a roller, may be rollable, and may serve to wind or unwind the display unit 250. The inner case 238 is axially connected to the intermediate case 220 so as to be rotatable.

The length sensing unit 211 may sense a wound length or an unwound length of the display unit 250. The length sensing unit 211 may include a magnetic member. The length sensing unit 211 may include at least one hall sensor. The length sensing unit 211 will be described later in more detail.

The rotation amount sensing unit 213 may sense the number of turns of the display unit 250 wound on the inner case 238. That is, the rotation amount sensing unit 213 may sense the number of turns of the display unit 250 wound on the inner case 238 as the display unit 250 is rolled. The rotation amount sensing unit 213 may include a magnetic member. The rotation amount sensing unit 213 may include at least one hall sensor. The rotation amount sensing unit 213 will be described later in more detail.

A plurality of electronic circuit components for operating the rollable display device 200-2 may be mounted on each circuit board 280.

The flexible circuit board 283 may connect electronic circuit components mounted on the inner case 238 to the display unit 250. The electronic circuit component may include at least one of the sensing unit 210, the storage unit 270, or the control unit 290 illustrated in FIG. 1A.

The support frame 262 may support the circuit board 280, and may be disposed in the inner case 238.

The inner case 238 may be rotated by magnetism between the length sensing unit 211 and rolling sensing units 234 spaced apart from each other under the display unit 250. The rolling sensing unit 234 may include a magnetic member, and may include at least one hall sensor. The display unit 250 may be rotated together with the inner case 238 while being rolled on the inner case 238 by the magnetism. In detail, the display unit 250 may be rolled by attraction between the rolling sensing unit 234 and the length sensing unit 211. For example, in the case where the length sensing unit 211 includes an N-pole magnetic member and the rolling sensing unit 234 includes an S-pole magnetic member, they attract each other. A position of the length sensing unit 211 may be fixed. The rolling sensing unit 234 is attracted towards the length sensing unit 211 while moving linearly, and the rolling sensing units 234 spaced apart from each other are continually introduced into the intermediate case 220. Since the rolling sensing unit 234 that has been already introduced and the length sensing unit 211 continuously attract each other, the rolling sensing unit 234 newly introduced and the length sensing unit 211 maintain a balance in terms of attraction so that the rolling sensing units 234 are rotated around the length sensing units 211. By virtue of this mechanism, the display unit 250 is wound while being rolled.

A sheet 222 provided with the rolling sensing unit 234 may be disposed on a lower surface of the display unit 250. The sheet 222 may be included in the display unit 250, or may be present independently from the display unit 250. The sheet 222 may be flexible. For example, the sheet 222 may be silicone or Thermoplastic Poly Urethane (TPU). The sheet 222 may be bonded to the lower surface of the display unit 250 in the form of a sheet frame, may sequentially fix the rolling sensing units 234, and may be formed through bonding, tape or insert molding. Furthermore, the sheet 222 may be formed of a material that is flexible, has excellent elasticity and elongation, and enables maintenance of a small thickness of the sheet 222. This is intended to allow the rolling sensing units 234 to have the same magnetic pole so that the display unit 250 is spread flat by repulsion. That is, the rolling sensing units 234 having the same magnetic pole repel each other by a repulsive force so that the display unit 250 is spread flat.

The length sensing unit 211 may sense magnetism between the rolling sensing unit 234 and the length sensing unit 211 to calculate the wound length or the unwound length of the display unit 250. The rotation amount sensing unit 213 may sense the number of turns of the display unit 250 wound on the outer circumferential surface of the inner case 238. This will be described later in more detail with reference to FIGS. 3E and 3F.

Referring to FIG. 3E, the length sensing unit 211 may include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensing unit 234 by sensing a change of magnetism in the circumferential direction of the inner case 238.

The arrows of FIGS. 3E and 3F represent a rotation direction of the inner case 238. The first hall sensor H1 alone senses the rolling sensing unit 234 in the second operation state in which the display unit 250 is maximally exposed as the inner case 238 is rotated. Thereafter, when the inner case 238 is rotated counterclockwise, the display unit 250 is wound on the inner case 238, and the second to fourth hall sensors H2 to H4 sequentially sense the rolling sensing unit 234. As described above, the first to fourth hall sensors H1 to H4 provide information for measuring a length of the display unit 250 wound along the outer circumferential surface of the inner case 238. The control unit 290 may detect a sensor that lastly senses the rolling sensing unit 234 when the display unit 250 is wound or unwound. Accordingly, the control unit 290 may calculate the wound length or the unwound length of the display unit 250. This is the same for the case where the display unit 250 is wound on the inner case 238 by multiple turns.

In the case where the display unit 250 is wound on the outer circumferential surface 238 in two or more layers, magnetism is changed in a radial direction of the inner case 238. Therefore, if a hall sensor for sensing the change is provided, the wound length of the display unit 250 may be measured more accurately.

For example, as illustrated in FIG. 3F, if two or more hall sensors are spaced apart from each other by a fixed distance in a radial direction of the inner case 238, a magnetism change of the rolling sensing unit 234 stacked in two or more layers on the outer circumferential surface of the inner case 238 may be sensed, so that the wound length of the display unit 250 may be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensing unit 234.

In more detail, in the second operation state (i.e., the state illustrated in FIG. 3D), the control unit 290 may calculate the wound length of the display unit 250 using the first to fourth hall sensors H1 to H4 while the display unit 250 is wound in one layer on the inner case 238. In the case where the display unit 250 is wound in two layers on the inner case 238, the fifth to seventh hall sensors H5 to H7 sense a change of magnetism in a radial direction. The control unit 290 may obtain the number of turns of the display unit 250 wound, using the magnetism change sensed by the fifth to seventh hall sensors H5 to H7. A length of the display unit 250 wound thereafter may be calculated using the first to fourth hall sensors H1 to H4, and, when the display unit 250 is stacked in three layers in a radial direction in which the fifth to seventh hall sensors H5 to H7 are arranged, the magnetism change is sensed by the fifth to seventh hall sensors H5 to H7. As described above, the control unit 290 may calculate the length of the display unit 250 wound on the outer circumferential surface of the inner case 238 using the first to fourth hall sensors H1 to H4, and may calculate the number of turns of the display unit 250 wound on the outer circumferential surface of the inner case 283 using the fifth to seventh hall sensors H5 to H7.

According to another embodiment, the rollable display device 200-2 may be additionally provided with the upper case 240, the intermediate case 220, and the lower case 260 at another end portion of the display unit 250. The elements described above with reference to FIG. 3D may be included in the intermediate case 220. Therefore, a user may grip the rollable display device 200-2 with both hands to extend or reduce the display unit 250.

The flexible display device 200 may include all configurations of a mobile terminal 100 described below with reference to FIG. 4.

A mobile terminal included in the flexible display device 200 will be described with reference to FIG. 4.

The mobile terminal described herein may include a cell phone, a smartphone, a laptop computer, a terminal for a digital broadcast, a personal digital assistant (PDA), a portable multimedia player (PMP), a navigator, a slate PC, a tablet PC, an ultrabook, a wearable device (e.g., a smartwatch, smart glasses, or a head mounted display (HMD)), or the like.

However, those skilled in the art would understand that configurations according to the embodiments described herein may also be applied to not only mobile devices but also non-mobile devices such as digital TVs, desktop computers or digital signage.

Figure 4:
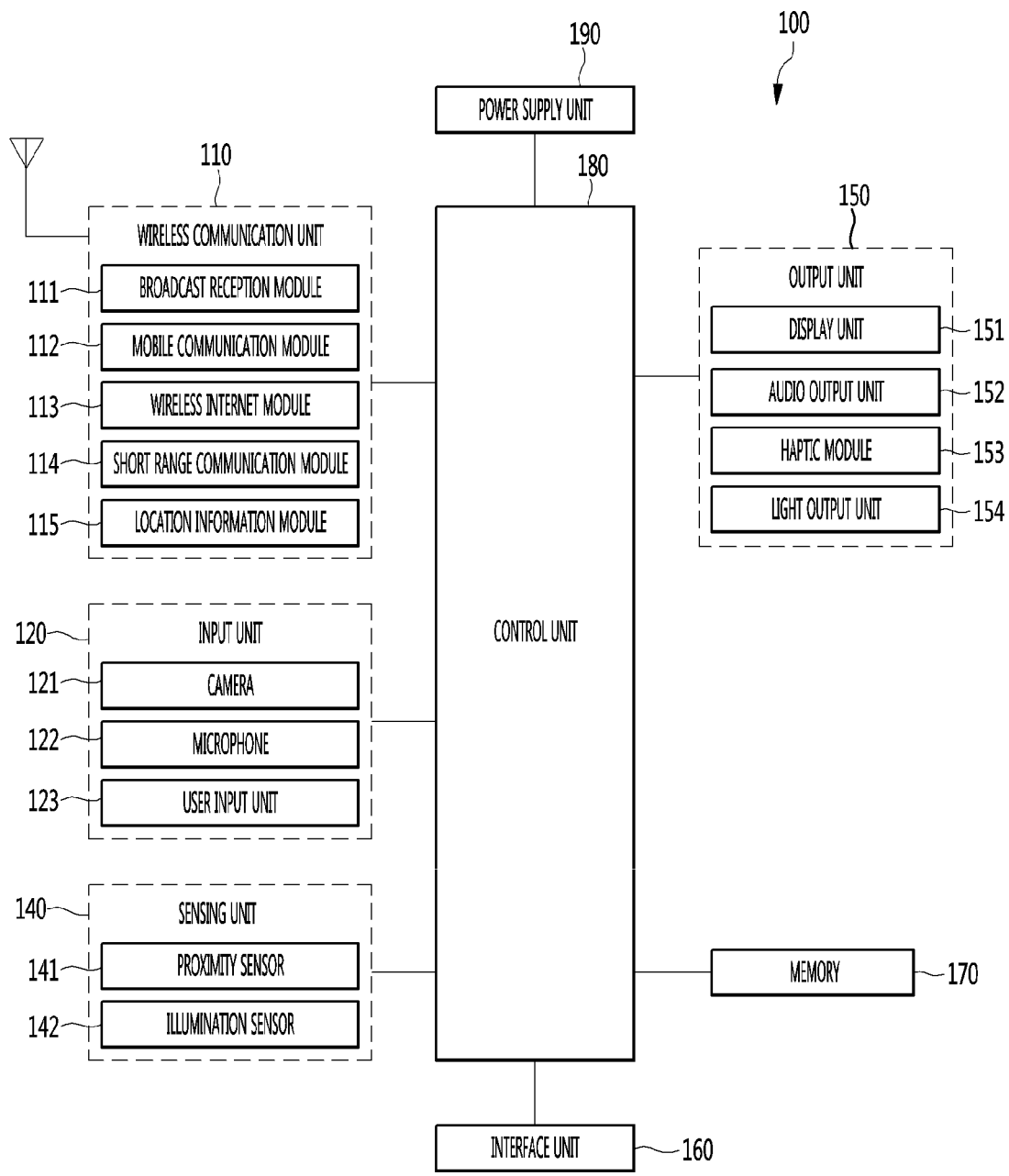
FIG. 4 is a block diagram for describing a mobile terminal in relation to an embodiment.

FIG. 4 is a block diagram for describing a mobile terminal in relation to an embodiment.

The flexible display device 200 may include elements of a mobile terminal 100. In particular, the sensing unit 210 of the flexible display device 200 may perform a function of a sensing unit 140 of the mobile terminal 100, the display unit 250 may perform a function of a display unit 151 of the mobile terminal 100, and the storage unit 270 may perform a function of a memory 170 of the mobile terminal 100.

The mobile terminal 100 may include a wireless communication unit 110, an input unit 120, a sensing unit 140, an output unit 150, an interface unit 160, a memory unit 170, a control unit 180, and a power supply unit 190. Since the elements illustrated in FIG. 4 are not essential for realizing a mobile terminal, a mobile terminal to be described herein may include more or fewer elements than the above-described.

In detail, the wireless communication unit 110 among the elements may include one or more modules enabling wireless communication between the mobile terminal 100 and another mobile terminal 100, or between the mobile terminal 100 and an external server. In addition, the wireless communication 110 may include one or more modules connecting the mobile terminal 100 to one or more networks.

The wireless communication unit 110 may include at least one of a broadcast reception module 111, a mobile communication module 112, a wireless internet module 113, a short range communication module 114, and a location information module 115.

The input unit 130 may include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 may be analyzed and processed with user's control commands.

The sensing unit 140 may include at least one sensor for sensing at least one of surrounding environment information around the mobile terminal and user information. For example, the sensing unit 140 may include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor (e.g., a barometer, a hygrometer, a thermometer, a radiation sensor, a thermal sensor, a gas detection sensor, etc.), a chemical sensor (e.g., an e-nose, a healthcare sensor, a biometric sensor, etc.). Furthermore, the mobile terminal disclosed herein may combine and use information sensed by at least two sensors among those sensors.

The output unit 150 is for generating an output related to sense of sight, sense of hearing, or sense of touch, and may include at least one selected from a display unit 151, an audio output unit 152, a haptic module 153, and a light output unit 154. The display unit 151 may form a mutually layered structure with or be formed into one with a touch sensor, and realize a touch screen. Such a touch screen may not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 may include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control may be performed on a connected external device in correspondence to connection between the external device and the interface unit 160.

In addition, the memory 170 stores data for supporting various functions of the mobile terminal 100. The memory 170 may store a plurality of application programs or applications driven in the mobile terminal 100, data for operations of the mobile terminal 100, and instructions. At least a part of these application programs may exist in the mobile terminal 100 at the time of release for basic functions (e.g., a call originating or receiving function, a message transmitting and receiving function). Moreover, the application programs are stored in the memory 170 and installed in the mobile terminal 100, and then may be driven to perform operations (or functions) of the mobile terminal by the control unit 180.

The control unit 180 typically controls overall operations of the mobile terminal 100 besides operations related to the application programs. The control unit 180 may provide the user with, or process proper information or functions by processing a signal, data, or information input or output through the above-described elements, or driving the application programs stored in the memory 170.

In addition, the control unit 180 may control at least a part of the elements illustrated in FIG. 4 so as to drive the application programs stored in the memory 170. Furthermore, the control unit 180 may combine at least two elements among the elements included in the mobile terminal 100 and operate the combined.

The power supply unit 190 receives internal or external power under a control of the control unit 180 and supplies the power to each element included in the mobile terminal 100. The power supply unit 190 includes a battery and the battery may be an embedded type battery or a replaceable battery.

At least a part of the elements may operate in cooperation with each other for realizing an operation, control, or control method of the mobile terminal according to various embodiments. In addition, the operation, control, or control method of the mobile terminal may be realized in the mobile terminal by driving at least one application program stored in the memory 170.

Hereinafter, the above-described elements are described in detail with reference to FIG. 4 before describing various embodiments realized through the mobile terminal 100.

Firstly, in the wireless communication unit 110, the broadcast reception module 111 receives a broadcast signal and/or broadcast related information from an external broadcast management server through a broadcast channel. The broadcast channel may include a satellite channel or a terrestrial channel. Two or more broadcast reception modules may be provided to the mobile terminal 100 for simultaneous broadcast reception or broadcast channel switching for at least two broadcast channels.

The mobile communication module 112 may transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal may include a voice call signal, a video call signal, or various types of data according to transmission and reception of a text/multimedia message.

The wireless internet module 113 refers to a module for a wireless internet connection, and may be embedded in or prepared outside the mobile terminal 100. The wireless internet module 113 is configured to transmit and receive a wireless signal over a communication network conforming with wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network may be understood as a kind of the mobile communication module 112.

The short range communication module 114 is for short range communication and may support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 may support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network may be a wireless personal area network.

Here, the other mobile terminal 100 may be a wearable device (e.g., a smart watch, a smart glass, or an HMD) through which data is mutually exchangeable (or interworkable) with the mobile terminal 100 according to an embodiment. The short range communication module 114 may detect (or recognize) a wearable device capable of communicating with the mobile terminal 100. Furthermore, when the detected wearable device is authenticated to communicate with the mobile terminal 100, the control unit 180 may transmit at least a part of data processed in the mobile terminal 100 to the wearable device through the short range communication module 114. Therefore, a user of the wearable device may use the data processed by the mobile terminal 100 through the wearable device. For example, when a call is received by the mobile terminal 100, the user may perform a phone call through the wearable device, or when a message is received by the mobile terminal 100, the user may check the received message through the wearable device.

The location information module 115 is for obtaining a location (or a current location) of the mobile terminal. As a representative example thereof, there is a global positioning system (GPS) module or a Wi-Fi module. For example, when adopting the GPS module, the mobile terminal may obtain a location of the mobile terminal by using a signal transmitted from a GPS satellite. For another example, when adopting the Wi-Fi module, the mobile terminal may obtain the location of the mobile terminal on the basis of information on a wireless access point (AP) transmitting or receiving a wireless signal with the Wi-Fi module. If necessary, the location information module 115 may additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 may include one or a plurality of cameras 121 for an input of image information. The camera 121 processes an image frame such as a still image or video obtained by an image sensor in a video call mode or an image capturing mode. The processed image frame may be displayed on the display unit 151 or stored in the memory 170. Furthermore, the plurality of cameras 121 prepared in the mobile terminal 100 may be arranged to form a matrix structure, and, through the cameras 121 forming this matrix structure, a plurality of pieces of information on images having different angles or different focuses may be input to the mobile terminal 100. In addition, the plurality of cameras 121 may be arranged in a stereo structure to obtain left and right images for realizing a stereoscopic image.

The microphone 122 may process an external sound signal as electrical voice data. The processed voice data may be variously used according to a function (or an application program) being performed in the mobile terminal 100. Furthermore, various noise removal algorithms may be implemented for removing noise generated in a process for receiving the external sound signal.

The user input unit 123 is for receiving information from the user. When information is input through the user input unit 123, the control unit 180 may control an operation of the mobile terminal 100 in correspondence to the input information. This user input unit 123 may include a mechanical input unit (or mechanical key, for example, buttons positioned on the front and rear surfaces or on the side surfaces, a dome switch, a jog wheel, or a jog switch, etc.) and a touch type input unit. As an example, the touch type input unit may be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, may be configured with graphics, texts, icons, videos, or a combination thereof.

Furthermore, the sensing unit 140 may sense at least one of environmental information surrounding the mobile terminal 100 and user information, and generate a sensing signal corresponding to the sensed information. The control unit 180 may control driving or operations of the mobile terminal 100, or perform data processing, a function, or an operation related to an application program installed in the mobile terminal 100, on the basis of the sensing signal. Hereinafter, representative sensors among various sensors that may be included in the sensing unit 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 may be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. When the touch screen is capacitive type, the proximity sensor 141 may be configured to detect an access of an object having conductivity by a change of an electric field according to the access of the object. In this case, the touch screen (or a touch sensor) itself may be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen when the object is subject to the proximity touch. The proximity sensor 141 may detect a proximity touch and a proximity touch pattern (e.g., a proximity touch distance, a proximity touch direction, a proximity touch speed, a proximity touch time, a proximity touch position, a proximity touch shift state, etc.). Furthermore, the control unit 180 may process data (or information) corresponding to a proximity touch action and the proximity touch pattern detected through the proximity sensor 141 and, in addition, may output visual information corresponding to the processed data on the touch screen. In addition, the control unit 180 may control the mobile terminal 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch schemes including a resistive-film scheme, a capacitive scheme, an infrared ray scheme, an ultrasonic scheme, and a magnetic field scheme.

As an example, the touch sensor may be configured to convert a change in pressure applied to a specific part or a change in capacitance generated at a specific part of the touch screen into an electrical input signal. The touch sensor may be configured to detect a position or an area thereon which is touched by a touch object touching the touch screen, or pressure or capacitance at the time of the touch. Here, the touch object may be an object applying a touch on the touch sensor, for example, a finger, a touch pen, a stylus pen, or a pointer.

In this way, when there is a touch input on the touch sensor, a signal (signals) corresponding thereto is (are) transmitted to a touch controller. The touch controller processes the signal(s) and transmits corresponding data to the control unit 180. Accordingly, the control unit 180 may know which area of the display unit 151 is touched. Here, the touch controller may be a separate element other than the control unit 180, or be the control unit itself.

Furthermore, the control unit 180 may perform different controls or an identical control according to a kind of the touch object, which touches the touch screen (or a touch key prepared other than the touch screen). Whether to perform different controls or an identical control according to a kind of the touch object may be determined according to a current operation state of the mobile terminal 100 or an application program being executed.

The above-described touch sensor and proximity sensor may sense independently or in a combined manner various types of touches on the touch screen, wherein the touches include a short (or a tap) touch, a long touch, a multi-touch, a drag touch, a flick touch, a pinch-in touch, a pinch-out, a swipe touch, and a hovering touch.

The ultrasonic sensor may recognize position information on a touch object by using an ultrasonic wave. The control unit 180 is able to calculate a position of a wave generating source through information sensed by an optical sensor and a plurality of ultrasonic sensors. The position of the wave generating source may be calculated by using a property that a light is very faster than the ultrasonic wave, in other words, a time that a light arrives at an optical sensor is very shorter than a time that an ultrasound wave arrives at an ultrasonic sensor. In detail, the position of the wave generating source may be calculated by using a time difference from a time when an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor.

The camera 121 and the laser sensor may be combined together and sense a touch of the sensing target for a 3-dimensional stereoscopic image. The photo sensor may be stacked on a display element, and this photo sensor scans a movement of the sensing target close to the touch screen. In detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target may be obtained.

The display unit 151 displays (outputs) information processed by the mobile terminal 100. For example, the display unit 151 may display execution screen information on the application program driven in the mobile terminal 100 or user interface (UI) information or graphic user interface (GUI) information according to the execution screen information.

In addition, the display unit 151 may be configured as a stereoscopic display unit displaying a stereoscopic image.

A 3-dimensional display scheme such as a stereoscopic scheme (glasses type), an autostereoscopic scheme (glassless type), or a projection scheme (a holographic scheme) may be applied to the stereoscopic display unit.

The sound output unit 152 may output audio data received from the wireless communication unit 110 or stored in the memory 170 in a call signal reception mode, a call mode or a recording mode, a speech recognition mode, or in a broadcast reception mode. The sound output unit 152 may output a sound signal related to a function (e.g., a call signal reception sound, or a message reception sound, etc.) performed in the mobile terminal 100. This sound output unit 152 may include a receiver, a speaker, or a buzzer, etc.

The haptic module 153 may generate various tactile effects that the user may feel. A representative example of the tactile effect that is generated by the haptic module 153 may be vibration. Strength and a pattern of the vibration generated by the haptic module 153 may be controlled by user selection or setting by the control unit. For example, the haptic module 153 may output different vibrations sequentially or by synthesizing them.

Besides the vibration, the haptic module 153 may generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 may be implemented to transfer the tactile effect through a direct contact, and may also be implemented for the user to feel the tactile effect through a muscle sense of a finger or an arm. The haptic module 153 may be prepared two or more in number according to a configuration aspect of the mobile terminal 100.

The optical output unit 154 may output a signal for notifying an event occurrence by using a light from an optical source of the mobile terminal 100. The event occurred in the mobile terminal 100 may be exemplified with message reception, call signal reception, missed calls, alarm, schedule notification, email reception, or information reception through an application.

The signal output by the optical output unit 154 is implemented according to that the mobile terminal emits a monochromatic light or a multi-chromatic light towards the front or rear surface. The signal output may be completed when the mobile terminal detects that the user checks the event.

The interface unit 160 may play a role of a passage with all external devices connected to the mobile terminal 100. The interface unit 160 may receive data from the external device, receive power and transfer the power to each element inside the mobile terminal 100, or allow internal data of the mobile terminal 100 to be transmitted to the external device. For example, the interface 160 may include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and may include a user identify module (UIM), a subscriber identity module (SIM), or a universal subscriber identity module (USIM). A device including the identification module (hereinafter, an 'identification device') may be manufactured in a smart card type. Accordingly, the identification device may be connected to the mobile terminal 100 through the interface unit 160.

In addition, when the mobile terminal 100 is connected to an external cradle, the interface unit 160 may be a passage through which power is supplied from the cradle to the mobile terminal 100 or a passage through which various command signals input from the cradle by the user are delivered. The various command signals or the power input from the cradle may operate as signals for perceiving that the mobile terminal 100 is accurately mounted in the cradle.

The memory 170 may store a program for operations of the control unit 180 and temporarily store input/output data (e.g., a phone book, messages, still images, videos, etc.). The memory 170 may store data about vibrations of various patterns and sounds at the time of a touch input on the touch screen.

The memory 170 may include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 may operate in relation to a web storage performing a storage function of the memory 170 over the internet.

Furthermore, as described above, the controller 180 normally controls overall operations and an operation related to an application program of the mobile terminal 100. For example, when a state of the mobile terminal satisfies a set condition, the control unit 180 executes or releases a lock state that limits an input of a user's control command to applications.

In addition, the control unit 180 may perform a control or a process related to a voice call, data communication, or a video call, etc., or may perform a pattern recognition processing for recognizing a written input and a drawing input performed on the touch screen as a character and an image, respectively. Furthermore, the control 180 may combine and control any one of or a plurality of the above-described elements in order to implement various embodiments to be described below in the mobile terminal 100.

The power supply unit 190 receives external or internal power under a control of the control unit 180 and supplies power necessary for operating each element. The power supply unit 190 includes a battery. The battery may be an embedded battery that is rechargeable and may be detachably coupled for charging.

The power supply unit 190 may include a connection port, and the connection port may be configured as an example of the interface 160 to which an external charger providing power is electrically connected for charging the battery.

As another example, the power supply unit 190 may be configured to charge the battery in a wireless manner without using the connection port. In this case, the power supply unit 190 may receive, from an external wireless power transmitting device, power by using one or more of an inductive coupling manner on the basis of a magnetic induction phenomenon and a magnetic resonance coupling manner on the basis of an electromagnetic resonance phenomenon.

Hereinafter, various embodiments may be implemented in a recording medium that is readable with a computer or a similar device by using software, hardware, or a combination thereof.

Next, description is made about a communication system realizable through the mobile terminal 100 according to an embodiment.

Firstly, the communication system may use different wireless interfaces and/or a physical layer. For example, the wireless interface available by the communication system may include Frequency Division Multiple Access (FDMA), Time Division Multiple Access (TDMA), Code Division Multiple Access (CDMA), Universal Mobile Telecommunications Systems (UMTS) (in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments may be applied to all communication systems including an Orthogonal Frequency Division Multiplexing (OFDM) wireless communication system as well as a CDMA wireless communication system.

The CDMA wireless communication system may include at least one terminal 100, at least one base station (BS, also may be referred to as Node B or Evolved Node B), at least one BS controller (BSC) and a mobile switching center (MSC). The MSC may be configured to be connected to the Public Switched Telephone Network (PSTN) and BSCs. The BSCs may be connected to the BS in pair through a backhaul line. The backhaul line may be prepared according to at least one selected from E1/T1, ATM, IP, PPP, Frame Relay, HDSL, ADSL, and xDSL. Accordingly, the plurality of BSCs may be included in a CDMA wireless communication system.

Each of a plurality of BSs may include at least one sector, and each sector may include an omni-directional antenna or an antenna indicating a specific radial direction from the BS. In addition, each sector may include two or more antennas having various types. Each BS may be configured to support a plurality of frequency allocations and each of the plurality of allocated frequencies may have specific spectrum (e.g., 1.25 MHz, or 5 MHz).

An intersection between the sector and the frequency allocation may be called as a CDMA channel. The BS may be called as a base station transceiver subsystem (BTSs). In this case, one BSC and at least one BS are called together as a "base station". The base station may also represent a "cell site". In addition, each of a plurality of sectors for a specific BS may also be called as a plurality of cell sites.

A broadcasting transmitter (BT) transmits a broadcast signal to terminals 100 operated in a system. The broadcast reception module 111 illustrated in FIG. 4 is prepared in the terminal 100 for receiving the broadcast signal transmitted by the BT.

Furthermore, in the CDMA wireless communication system, a global positioning system (GPS) may be linked for checking a location of the mobile terminal 100. A satellite is helpful for grasping the location of the mobile terminal. Useful location information may be obtained by less than two or at least two satellites. Here, the location of the mobile terminal 100 may be tracked by using all techniques, which are capable of tracking the location, as well as a GPS tracking technique. In addition, at least one of GPS satellites may be selectively or additionally responsible for transmitting satellite digital multimedia broadcasting (DMB).

The location information module 115 prepared in the mobile terminal 100 is for detecting, operating or identifying the location of the mobile terminal 100, and may representatively include a GPS module and a WiFi module. If necessary, the location information module 115 may alternatively or additionally perform any function of other modules in the wireless communication unit 110 for obtaining data for the location of the mobile terminal 100.

The GPS module 115 may precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 may calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) may be used.

The WPS is a technique for tracking the location of the mobile terminal 100 using a WiFi module prepared in the mobile terminal 100 and a wireless access point (AP) transmitting or receiving a wireless signal to or from the WiFi module, and may mean a location measurement technique based on a wireless local area network (WLAN) using WiFi.

The WPS may include a WiFi positioning server, the mobile terminal 100, a wireless AP connected to the mobile terminal 100, and a database storing arbitrary wireless AP information.

The mobile terminal 100 connected to the wireless AP may transmit a location information request message to the WiFi positioning server.

The WiFi positioning server extracts information on the wireless AP connected to the mobile terminal 100 on the basis of the location information request message (or a signal) of the mobile terminal 100. The information on the wireless AP connected to the mobile terminal 100 may be transmitted to the WiFi positioning server through the mobile terminal 100 or transmitted to the WiFi positioning server from the wireless AP.

The information on the wireless AP, which is extracted on the basis of the location information request message of the mobile terminal 100, may be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server may receive information on the wireless AP connected to the mobile terminal 100, and extract wireless AP information corresponding to the wireless AP to which the mobile terminal is being connected from the pre-constructed database. At this point, information on arbitrary wireless APs, which is stored in the database, may be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. At this point, in order to remove a wireless AP provided by using a mobile AP or an illegal MAC address in the location measurement process, the WiFi positioning server may extract a predetermined number of pieces of wireless AP information in the descending order of an RSSI.

Thereafter, the WiFi positioning server may extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method may be used.

The cell-ID method is a method of determining a location of a wireless AP having strongest strength from among surrounding wireless AP information collected by a mobile terminal. This method is advantageous in that implementation is simple, an additional cost is not necessary, and location information may be rapidly obtained. However, when installation intensity of a wireless AP is lower, positioning precision becomes lowered.

The fingerprint method is a method of selecting a reference location in a service area, collecting signal strength information, and estimating a location through signal strength information transmitted from a mobile terminal on the basis of the collected information. In order to use the fingerprint method, it is necessary to construct a database for propagation characteristics in advance.

The trigonometry is a method of operating a location of a mobile terminal on the basis of a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal may be used.

The landmark method is a method of measuring a location of a mobile terminal by using a landmark transmitter.

Besides the above-described methods, various algorithms may be used for extracting (or analyzing) location information on a mobile terminal.

The location information on the mobile terminal 100 extracted in this way may be transmitted to the mobile terminal 100 through the WiFi positioning server and the mobile terminal 100 may obtain the location information.

The mobile terminal 100 may obtain location information by being connected to at least one wireless AP. At this point, the number of wireless APs requested for obtaining the location information on the mobile terminal 100 may be variously varied according to a wireless communication environment in which the mobile terminal 100 is located.

Various embodiments of a method for operating the flexible display device 200 will be described. The embodiments may be applied to both the stretchable display device 200_1 described above with reference to FIGS. 2A and 2B and the rollable display device 200_2 described above with reference to FIGS. 3A to 3F.

FIG. 5 is a flowchart illustrating an operating method of a flexible display device according to another embodiment of the present invention.

The control unit 290 of the flexible display device 200 displays the first information on the region corresponding to the first distance of the screen of the display unit 250 (S501). According to one embodiment, when the flexible display device 200 is the rollable display device 200-2, the control unit 290 may display the first information on the screen of the first operation state illustrated in FIG. 3B. However, the present invention is not limited thereto, and the control unit 290 may display the first information on a region of the display unit 250 that the screen is expanded by the first distance. The first distance may be greater than or equal to a reference distance. According to one embodiment, the reference distance may be a reference distance for displaying information on the screen of the display unit 250. According to another embodiment, the reference distance may be a reference distance for displaying information on an expanded screen of the display unit 250. In other words, when the screen is longer than the reference distance, second information or third information to be described later may be displayed on the expanded region.

According to another embodiment, when the flexible display device 200 is a stretchable display device 200-1, the control unit 290 may display the first information on the screen of the display unit 250 before the display device 200 is transformed.

According to one embodiment, the first information may include a mail list including a plurality of mail items. Each mail item may include information on the user who sent the mail, the title of the mail, the time point at which the mail was received, and some of the detailed information of the mail.

According to one embodiment, the first information may be the detailed information of the mail provided as the mail item is selected.

According to another embodiment, the first information may include a text message list including a plurality of text message items.

The control unit 290, through the sensing unit 210, detects that the screen of the display unit 250 is expanded (S503) and extends the screen of the display unit 250 by a second distance (S505). According to one embodiment, the second distance may be equal to the first distance. The second distance may be greater than or equal to the reference distance. The region size of the screen corresponding to the first distance and the region size of the screen corresponding to the second distance may be the same.

According to one embodiment, the control unit 290 may control independently the region corresponding to the first distance and the region corresponding to the second distance. The region corresponding to the first distance and the region corresponding to the second distance may operate in the form of one screen. For example, an operation based on an input received on the region corresponding to the first distance may not exert an influence on the region corresponding to the second distance. However, in some cases, the operation based on the input received on the region corresponding to the first distance may exert an influence on the region corresponding to the second distance. The details thereof will be described later.

The control unit 290 may display a portion of the second information or may not display any information on the expanded region while expanding the screen of the display unit 250. In other words, when the expanded distance of the screen is less than the reference distance, the control unit 290 may display a portion of the second information, and may not display any information on the expanded region.

The control unit 290 displays second information which is time-series associated with the first information, on the region corresponding to the second distance (S507). According to one embodiment, the second information may be information received before receiving the first information. More specifically, the second information may be information received just before receiving the first information. For example, if the first information is a mail received from counterpart, the second information may be a mail transmitted to counterpart before the mail received from counterpart, or another mail received before the mail received from counterpart. In this case, the mail is described by way of example, but the present invention is not limited thereto. For example, the second information may be some types of information, such as a text message, exchanged with counterpart.

According to one embodiment, the second information may be information associated with the first information, or information that is not displayed on a first region 610. In other words, the second information may be information that is not displayed on the screen due to the limitation of the size of the first region 610. The second information is information that may be displayed on the second region through the scroll function.

Steps S501 to S507 will be described with reference to the following figures.

Hereinafter, it is assumed that the flexible display device 200 is a rollable display device 200-2, but may be applied to the stretchable display device 200-1.

FIGS. 6A to 7B are views illustrating the procedure of providing second information time-series associated with the first information, which is displayed on the region corresponding to the first distance, on a region corresponding to the second distance according to an embodiment of the present invention.

Hereinafter, description will be made with reference to FIGS. 6A to 6E.

Referring to FIG. 6A, the display unit 250 of the rollable display device 200-2 is disposed inside the intermediate case 220 and may not be exposed to the outside.

Figure 6B:
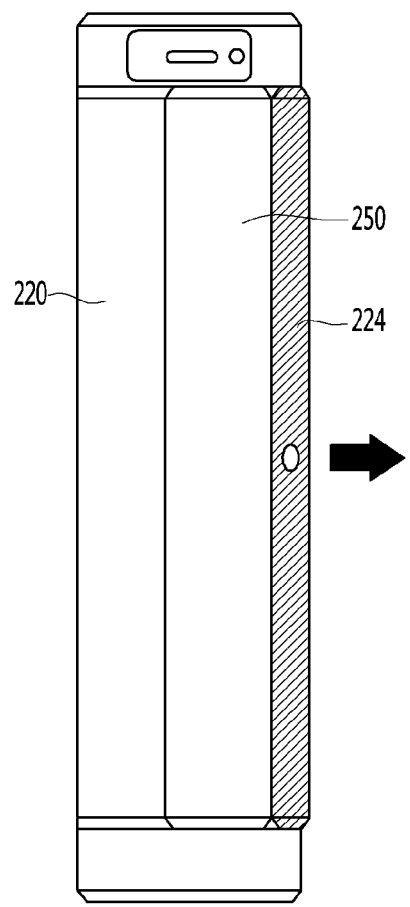
FIGS. 6A to 7B are views illustrating the procedure of providing second information time-series associated with the first information, which is displayed on the region corresponding to the first distance, on a region corresponding to the second distance according to an embodiment of the present invention.
Figure 6C:
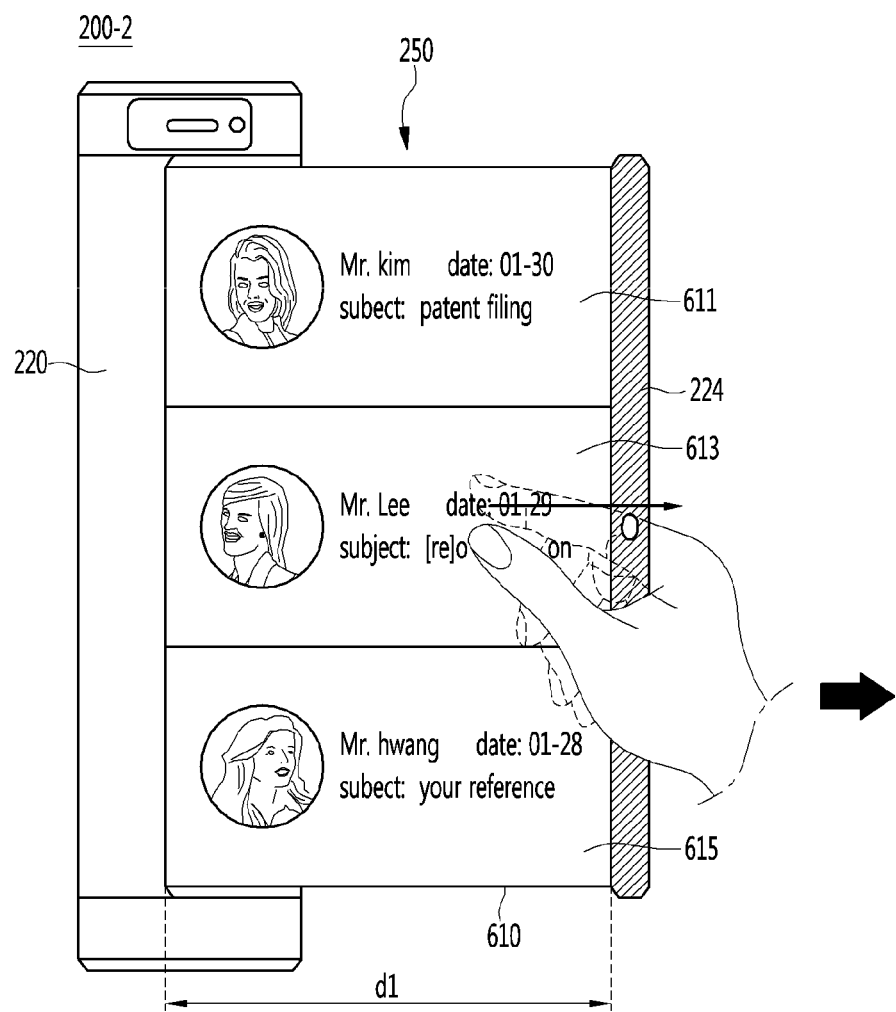

As another example, a region of the display unit 250 corresponding to a predetermined distance may be exposed to the outside of the intermediate case 220, as illustrated in FIG. 6B. In the state of FIG. 6A or 6B, the control unit 290 senses that the screen size of the display unit 250 has been enlarged and may extend the screen of the display unit 250 by the first region 610 corresponding to the first distance d1 in the first direction. The user may pull the second holder 224 in the first direction to extend the screen of the display unit 250 by the first region 610 corresponding to the first distance d1 (FIG. 6C). As shown in FIG. 6C, the control unit 290 may display a plurality of mail items 611, 613, and 615 on the first region 610. Each of the plurality of mail items 611, 613, and 615 may include summary information of the received mail. The summary information of the mail may include at least one of a time at which the mail was received, a title of the mail, and information (name, e-mail address) of counterpart that transmitted the mail.

Figure 6D:
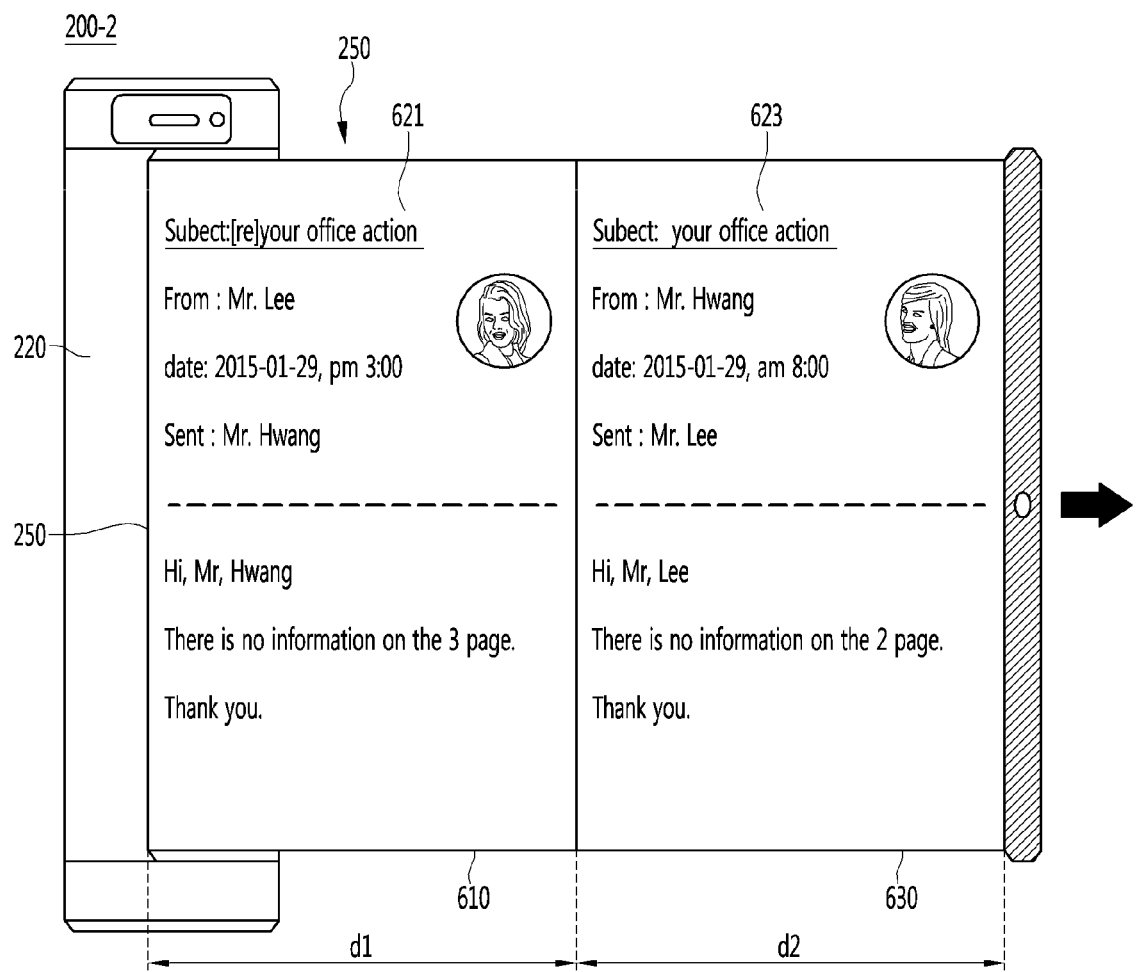

When sensing that the mail item 613 displayed on the first region 610 is selected or that the screen of the display unit 250 is expanded while the selection is maintained, the control unit 290 may extend the screen of the display unit 250 by the second region 630 corresponding to the second distance d2 (FIG. 6D). Each of the first distance d1 and the second distance d2 may be greater than or equal to the reference distance. The first distance d1 and the second distance d2 may be equal to each other and the size of the first region 610 and the size of the second region 630 may be equal to each other. Each of the first region 610 and the second region 630 may be controlled as an independent screen.

As shown in FIG. 6D, the control unit 290 may display detailed information on mail items 613 selected in the first region 610 and the second region 630, respectively. In detail, the control unit 290 may display the mail exchanged with the other part having receiving the selected mail item 613 in the first region 610 and the second region 630. In other words, as shown in FIG. 6D, the control unit 290 may display the first mail 621 corresponding to the selected mail item 613 on the first region 610 and display the second mail 623 sent to counterpart on the second region 630 before the first mail 621 is received. The second mail 623 displayed on the second region 630 may be a mail sent by the user to counterpart immediately before the first mail 621 is received. In other words, the second mail 623 may be a mail time-series associated with the first mail 621. Even if the amount of information included in each of the first mail 621 and the second mail 623 is different, the control unit 290 may display the information on each mail according to the size of each region.

Figure 6E:
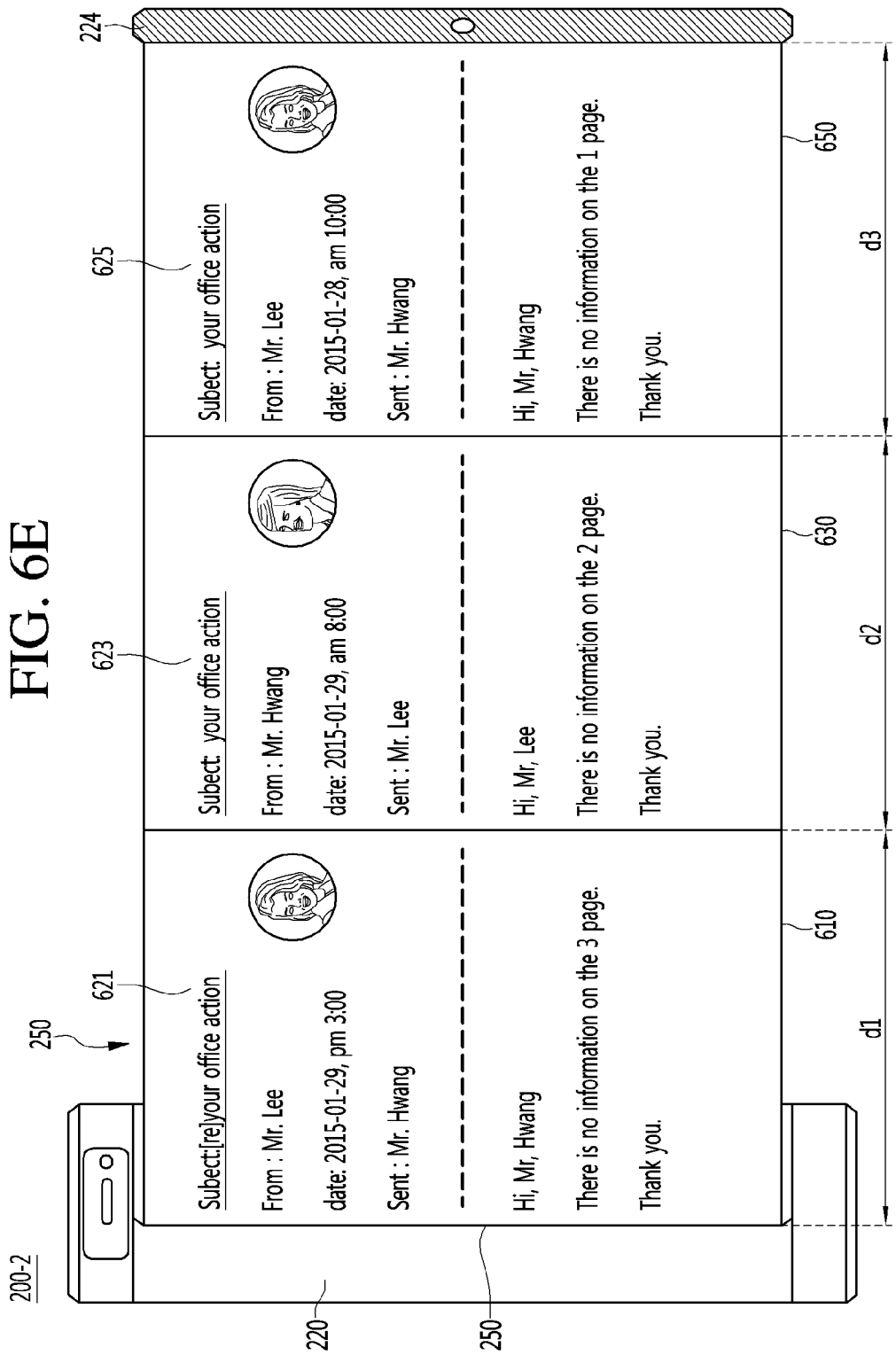

Meanwhile, referring to FIG. 6E, the screen of the display unit 250 may be expanded by a third region 650 corresponding to a third distance d3 in the state that the state is expanded by the first region 610 and the second region 630. The third distance may be greater than the reference distance. The third distance may be equal to the first distance and the second distance. The control unit 290 may display the third mail 625 corresponding to the previous time point of the second mail 623 on the third region 650. The third mail 625 may be a mail received from counterpart before the user sends the second mail 623 to counterpart. The first mail 621, the second mail 623, and the third mail 625 may be configured one. The control unit 290 may distinguish between the mails using the sender and the sending time point of each mail and the recipient and the receiving time point of each mail. In other words, each mail may include an identifier for identifying the corresponding mail, and the control unit 290 may identify each mail using the identifier. The control unit 290 may sequentially display the identified mails as the screen is expanded.

Hereinafter, description will be made with reference to FIGS. 7A and 7B.

Figure 7A:
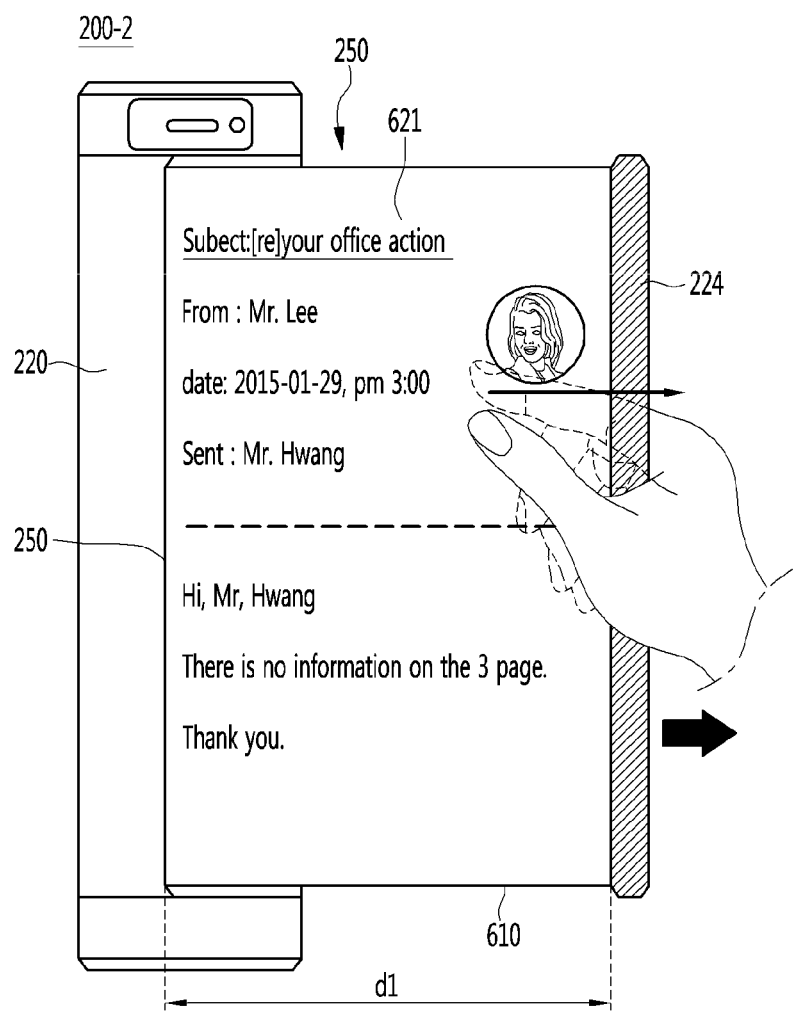
Figure 7B:
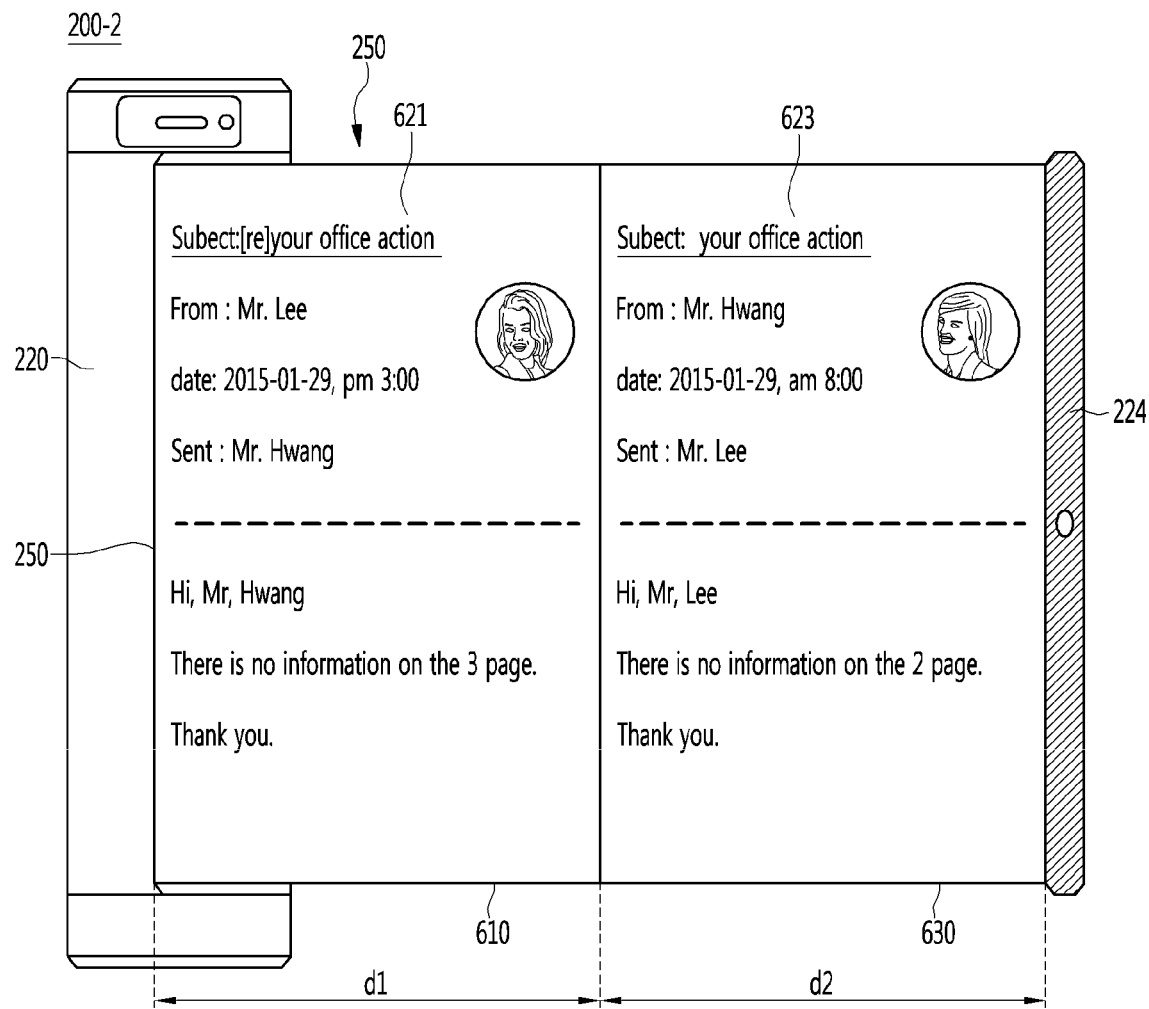

Referring to FIG. 7A, a screen of the display unit 250 displays the first mail 621 on the first region 610 corresponding to the first distance d1. The first region 610 may be an expanded region of the screen or a screen region before the display unit 250 is transformed. The first mail 621 may be a mail received from a specific counterparty. The control unit 290 may detect that the screen size of the display unit 250 is expanded and expand the screen size of the display unit 250 by the second region 630 corresponding to the second distance d2 as illustrated in FIG. 7B. The control unit 290 may display the second mail 623 on the second region 630. The second mail 623 may be a mail sent by the user to a specific counterpart before receiving the first mail 621 from the specific counterpart. Meanwhile, the screen of the display unit 250 may be expanded from the state of FIG. 7B by the third region 650 corresponding to the third distance d3 as illustrated in FIG. 6E.

According to the embodiment of the present invention, the user may pull the mail item 613 and recognize the history of the mails exchanged with the counterpart corresponding to the mail item 613 at a glance.

The control unit 290 receives a request to select one of the plurality of items included in the first information or the second information (S509), and performs a function corresponding to the selected item according to the received request (S511). According to one embodiment, when the first information and the second information relate to mails, each mail may include a plurality of items. The items may include one of an attached-file item, a recipient item, a sender item, and a reply item or more. The control unit 290 may receive a request to select any one of the plurality of items and perform a function corresponding to the selected item on the existing display region or on the expanded display region according to the received request. The details thereof will be described with reference to the following drawings.

FIGS. 8A to 8D are views illustrating examples of providing a preview function of the attached file on an existing display region or an expanded display region according to the request to select the attached file item included in the mail.

Figure 8B:
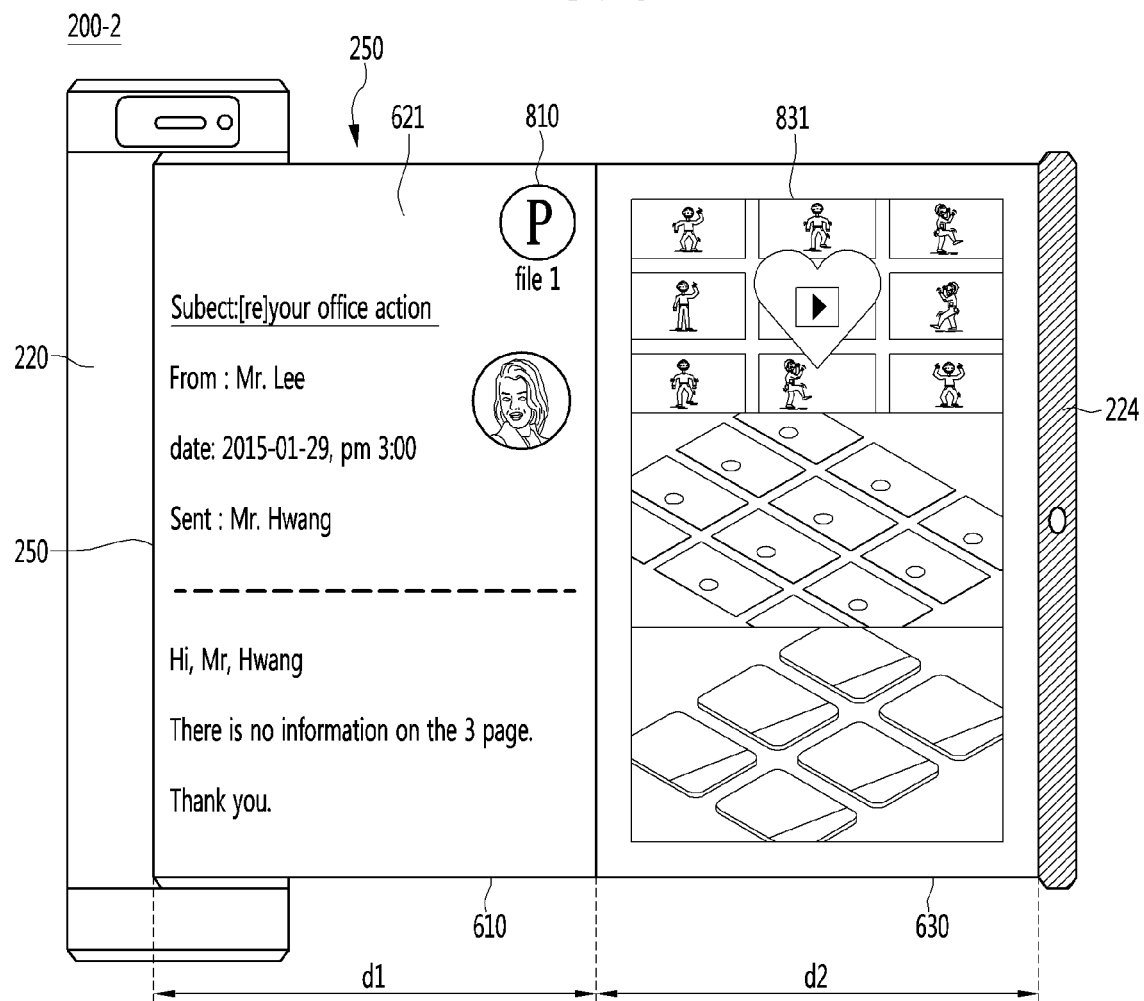

Referring to FIG. 8A, the display unit 250 displays the first mail 621 on the first region 610 included in the screen, which corresponds to the first distance d1. The display unit 250 displays the second mail 623 on the second region 630 corresponding to the second distance d2. The first mail 621 may include an attached-file item 810 indicating that the file is attached to the mail. The second mail 623 may include an attached-file item 830 indicating that a file is attached to the mail. Each of the first region 610 and the second region 630 may be a region in which the screen is expanded, but is not limited thereto and only the second region 630 is an expanded region of the screen, and the first region 610 may be an region before the display unit is expanded. The control unit 290 may display, on the second region 630, preview information 831 of the attached file corresponding to the attached-file item 830 as illustrated in FIG. 8B according to the request to select the attached-file item 830 included in the second mail 623. In other words, the control unit 290 may switch the second mail 623 to the preview information 831 according to the request to select the attached-file item 830. The user may easily recognize the preview information 831 of the attached file attached to the second mail 623 through the second region 630. Meanwhile, when the attached-file item 810 included in the first mail 621 is selected, the control unit 290 may display preview information of the attached-file item 810 on the first region 610.

Referring to FIG. 8C, the control unit 290 may detect that the screen of the display unit 250 is expanded while maintaining the request to select the attached-file item 830. The control unit 290 may extend the screen of the display unit 250 by a third region 650 corresponding to the third distance d3 as illustrated in FIG. 8D. The control unit 290 may display preview information 831 of the attached file corresponding to the attached-file item 830 on the third region 650 on the third region 650. The user may view the preview information 831 of the file attached to the second mail 623 while viewing the contents of the second mail 623.

Hereinafter, description will be made with reference to FIGS. 9A and 9B.

Figure 9A:
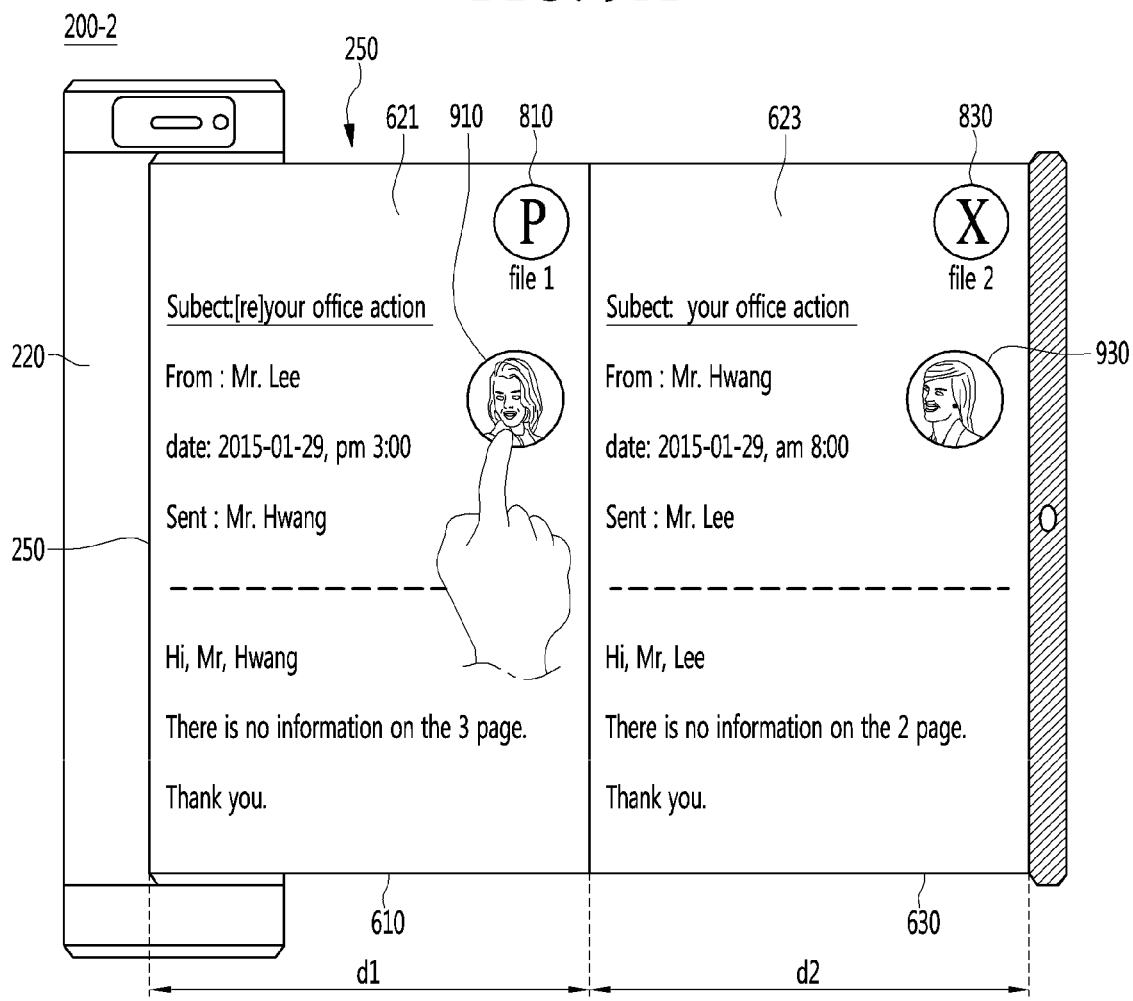
FIGS. 9A and 9B are views illustrating a function of filtering and providing mails sent by a sender on a display region according to the request to select a sender item included in a mail.
Figure 9B:
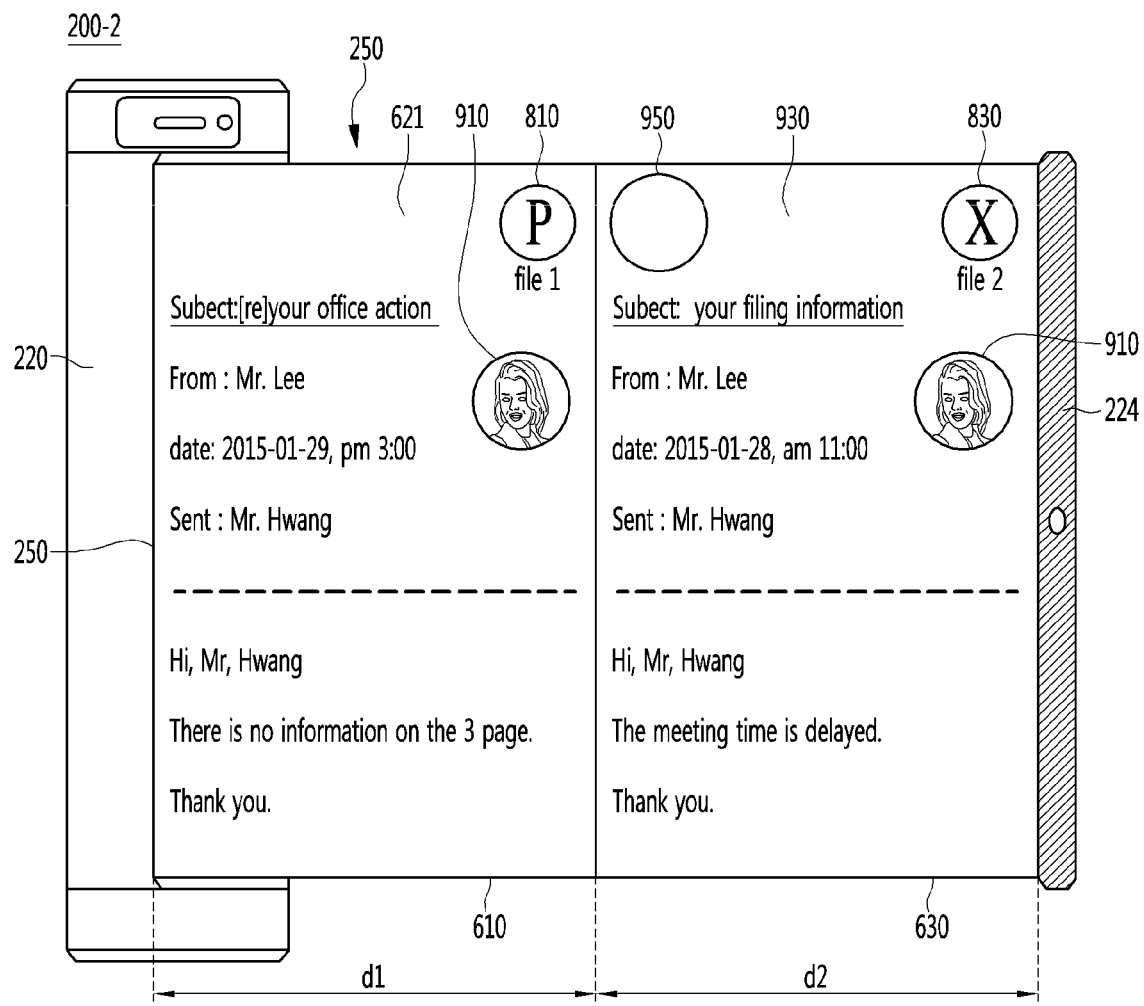

FIGS. 9A and 9B are views illustrating a function of filtering and providing mails sent by a sender on a display region according to the request to select a sender item included in a mail.

When comparing the description made with reference to FIG. 8A, the same description will be omitted from FIG. 9A. The first mail 621 may further include a sender item 910. The sender item 910 may include information indicating the counterpart who sent the first mail 621 to the user. The sender item 910 may include one of the image of the counterpart, the name of the counterpart (Mr. Lee), and the email address of the counterpart. The control unit 290 controls the display unit 250 to display only the mails sent from the sender and corresponding to the selected sender item 910 as illustrated in FIG. 9B as the control unit 290 receives the request to select the sender item 910. In detail, the control unit 290 may switch the second mail 623 displayed on the second region 630 to another mail 930 as the control unit 290 receives the request to select the sender item 910. The another mail 930 may be a mail sent to the user by the sender (Mr. Lee) before the sender (Mr. Lee) sends the first mail 621. At this time, since the first mail 621 displayed on the first region 610 is a mail sent from the selected sender (Mr. Lee), the display of the first mail 621 may be maintained.

The user may filter only the mails sent by a specific sender. by selecting the sender item 910 and thus may easily access the mails.

Meanwhile, when the mail filtering function is performed in FIG. 9B, the another mail 930 may further include a mail filtering cancel item 950. The control unit 290 may cancel the mail filtering function and return the display unit 250 to the state of FIG. 9A according to the request to select the mail filtering cancel item 950.

Meanwhile, although only the example of selecting which the sender item 910 and filtering the mail has been described with reference to FIGS. 9A and 9B, the present invention is not limited. In other words, as the recipient item is selected, the mail sent by the recipient may be filtered and provided.

Hereinafter, description will be made with reference to FIGS. 10A and 10B.

Figure 10A:
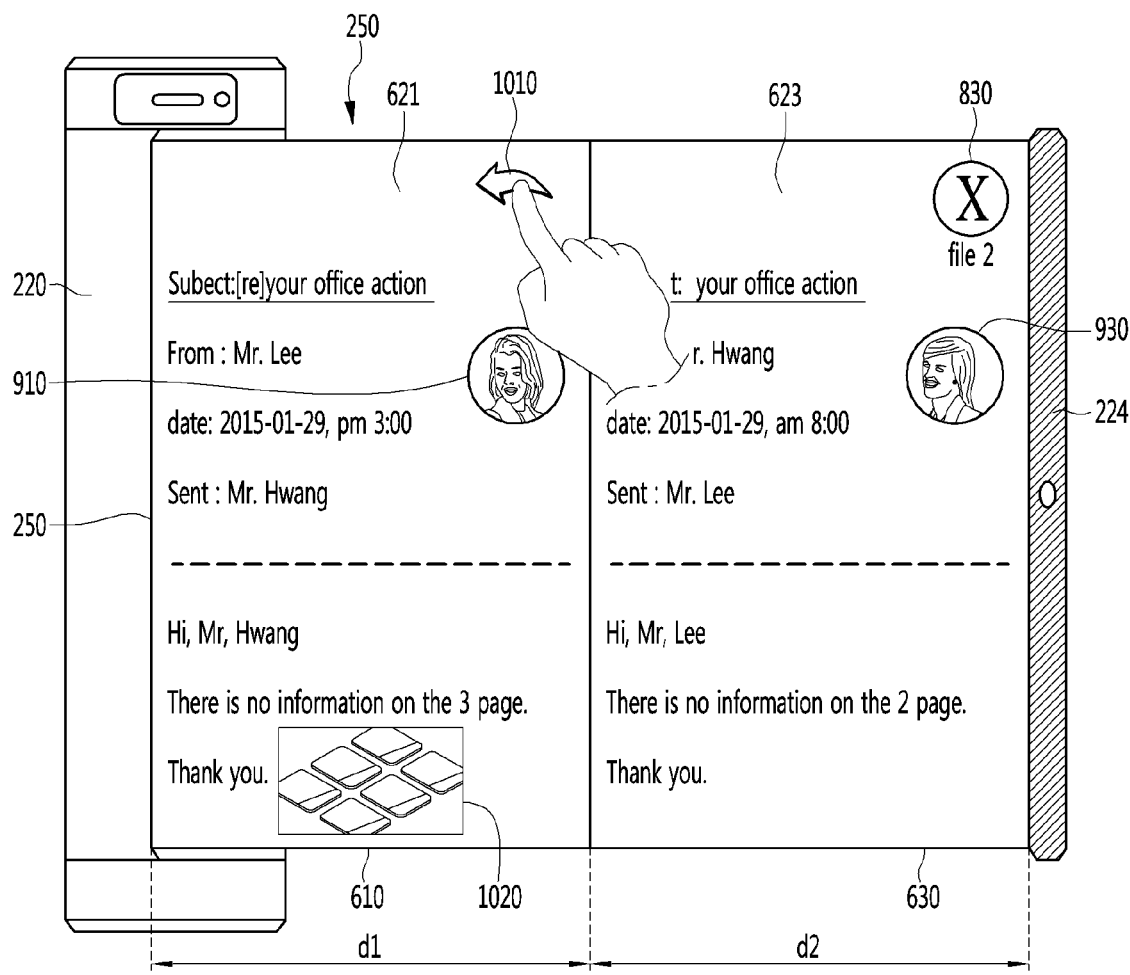
FIGS. 10A and 10B are views illustrating a function of filtering and providing mails sent from a sender on an expanded display region in response to a request to select a reply item included in the mail.
Figure 10B:
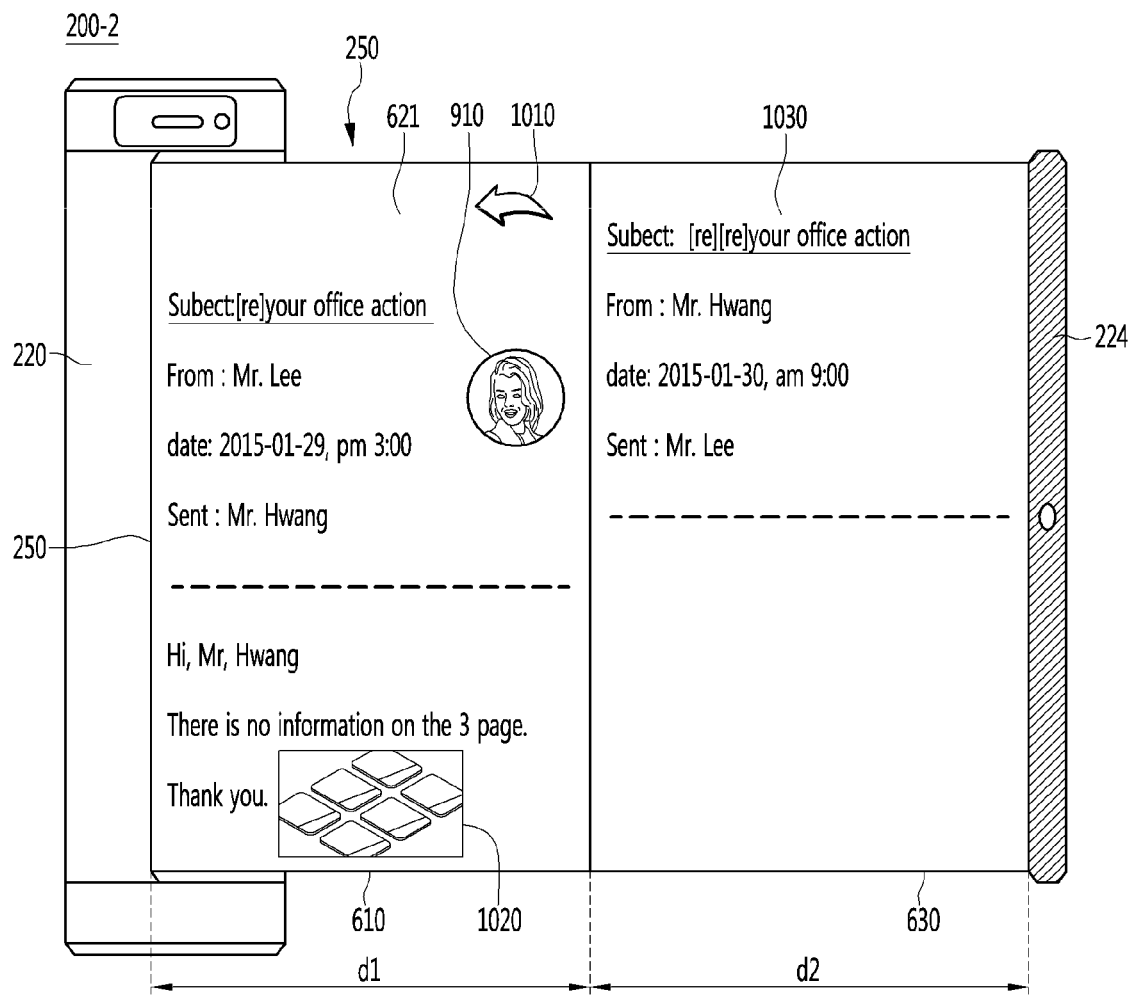

FIGS. 10A and 10B are views illustrating a function of filtering and providing mails sent from a sender on an expanded display region in response to a request to select a reply item included in the mail.

When comparing the description made with reference to FIG. 9A, the same description will be omitted from FIG. 10A. The first mail 621 may include a reply item 1010. The reply item 1010 may be an item for providing a reply mail window for reply to the counterpart who has sent the first mail 621. The control unit 290 may display the reply mail window 1030 on the second region 1030 as shown in FIG. 10B as the control unit 290 receives the request to select the reply item 1010. The control unit 290 may receive a drag and drop input the attached file 1020 into the second region 630 when the first mail 621 displayed on the first region 610 includes the attached file 1020. The control unit 290 may attach the attached file 1020 attached to the first mail 621 to the reply mail window 1030 according to the received drag and drop input. The user may easily use the text of the first mail 621 or the attached file 1020 while checking the contents of the first mail 621.

Hereinafter, description will be made with reference to FIGS. 11A and 11B.

Figure 11A:
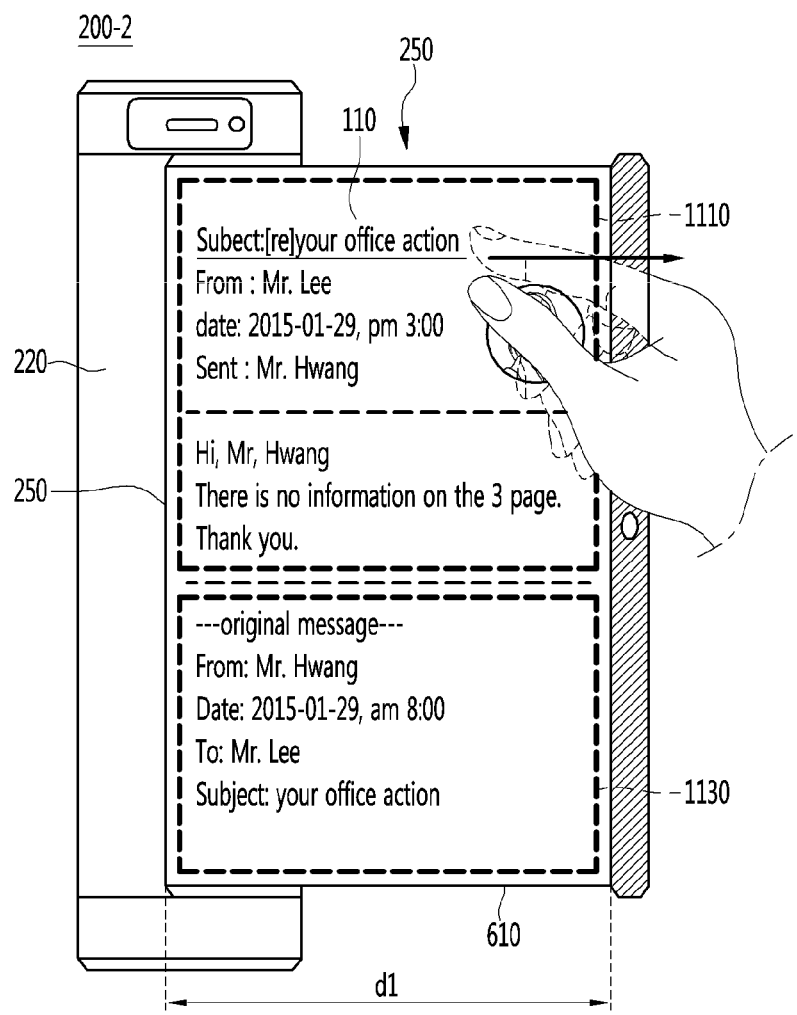
FIGS. 11A and 11B are views an example of providing mails corresponding to a selected region on a screen as the screen of the display unit is expanded after information on a received mail or a sent mail (received-mail information or sent-mail information).
Figure 11B:
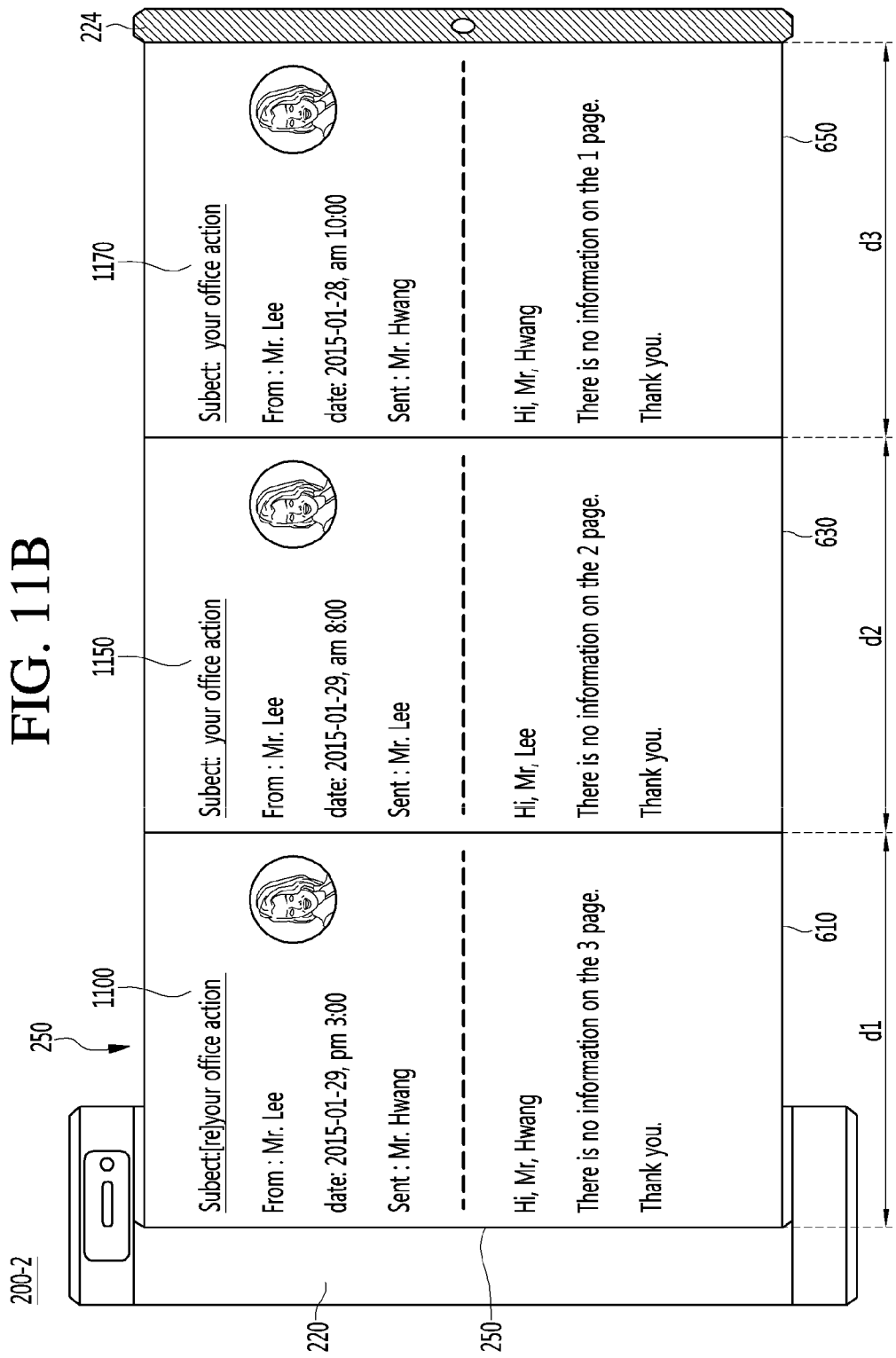

FIGS. 11A and 11B are views an example of providing mails corresponding to a selected region on a screen as the screen of the display unit is expanded after information on a received mail or a sent mail (received-mail information or sent-mail information).

Referring to FIG. 11A, a screen of the display unit 250 displays first information 1100 on the first region 610 corresponding to the first distance d1. The first information 1100 may include received-mail information 1110 and sent-mail information 1130. The received-mail information 1110 includes information on a mail received from counterpart, and the sent-mail information 1130 may include information about mail that the user has sent to the counterpart. When the received-mail information 1110 is selected and when it is sensed that the screen of the display unit 250 is expanded, the control unit 290 may display only information on the received mail on the expanded region. In detail, referring to FIG. 11B, the control unit 290 may control the second region 630 corresponding to the second distance d2 to display the mail 1150 received before the sent-mail information 1130 instead of the sent-mail information 1130. At the same time, the control unit 290 may allow the sent-mail information 1100 having been displayed on the first region 610 to disappear and may display only the received-mail information 1110. The received-mail information 1110 may be enlarged and displayed on the first region 610.

When the screen of the display unit 250 is additionally expanded by the third region 650 corresponding to the third distance d3, the control unit 290 may display a mail 1170, which is received before the mail 1150, on the third region 650.

Meanwhile, when the sent-mail information 1130 is selected in FIG. 11A and when it is detected that the screen of the display unit 250 is expanded, the control unit 290 displays only the information on the mail sent by the user on the expanded region. At the same time, the control unit 290 may allow the received-mail information 1110 to disappear from the first region 610, and may allow only the outgoing mail information 1130 to be displayed on the first region 610.

The user may easily check only received mails or sent mails only by selecting the received-mail information or sent-mail information and then expanding the screen.

Next, according to an embodiment of the present invention, when the screen of the display unit 250 is expanded to the maximum size, the information in the hidden region may be scrolled and displayed.

Figure 12B:
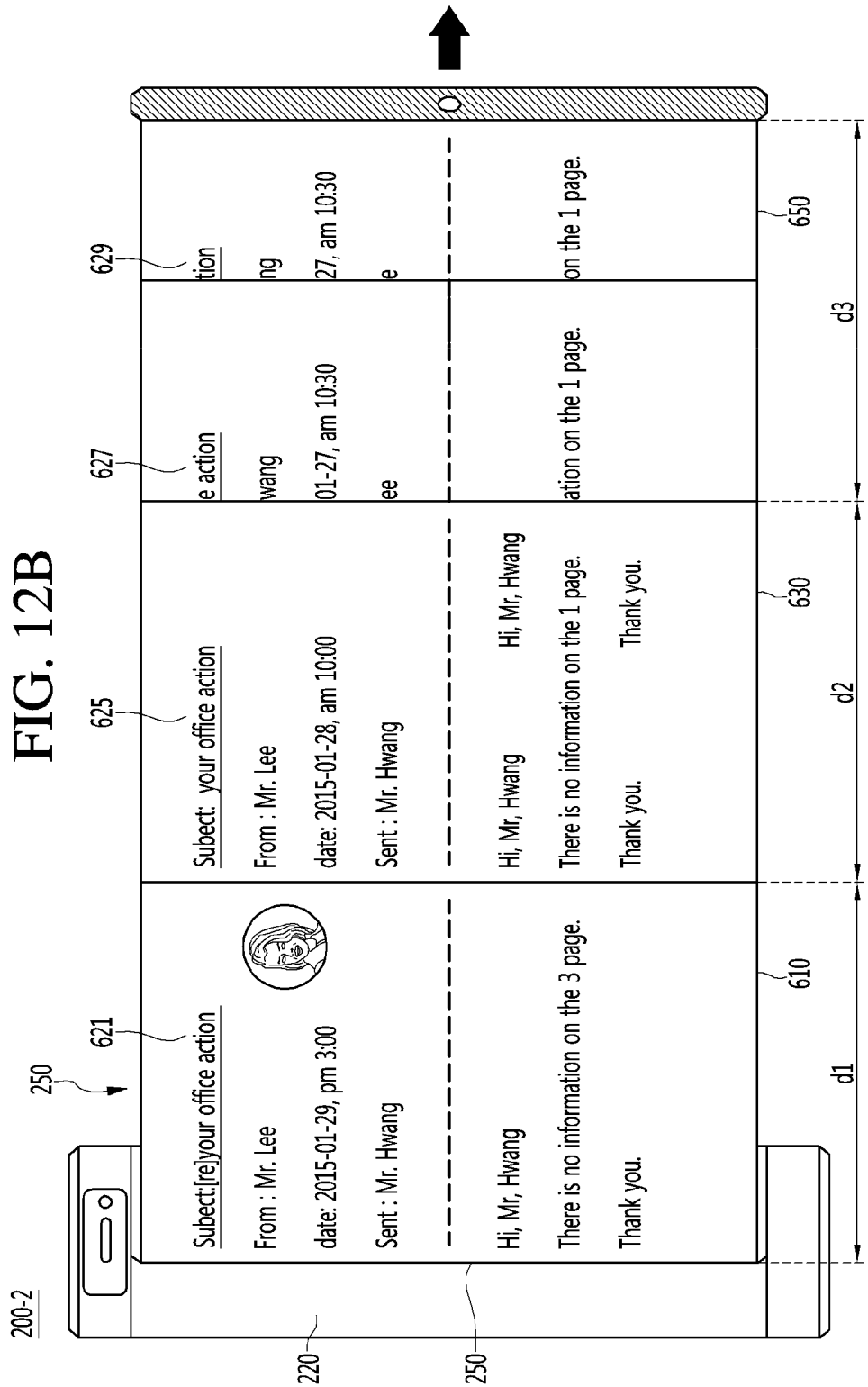

FIGS. 12A and 12B are views illustrating an example of scrolling and displaying information positioned in a hidden region when a screen of the display unit is expanded to a maximum size and an input for expanding the screen is detected according to an embodiment of the present invention.

FIG. 12A is the same as FIG. 6E, and thus the redundant detail thereof will be omitted. However, FIG. 12A is different from FIG. 6E in that the screen of the display unit 250 is expanded to the maximum size.

In FIG. 12A, when the input of expanding the screen is sensed in a state that the screen of the display unit 250 is expanded to the maximum size in the specific direction, the control unit 290 sequentially displays information 627 and 627, which are not displayed, on the screen as illustrated in FIG. 12B. According to one embodiment, the input of expanding the screen may be an input of pulling a second holder 224 in a specific direction in the state that the screen of the display unit 250 is expanded to the maximum size. The control unit 290 may sequentially display the mails 627 and 629 on the expanded region according to the detected screen extension input. The control unit 290 may display the first mail 621 displayed on the first region 610 as it is and may display the information 627 and 629 that were not displayed on the remaining regions 630 and 650. In other words, the control unit 290 displays the first mail 621 displayed on the first region 610 and displays the third mail 623, which has been displayed on the third region 650, on the second region 630. In addition, the control unit 290 may display mails 627 and 629, which have not been displayed, on the third region 650. The mail 627 may be a mail exchanged with the counterpart before the third mail 625 and the mail 629 may be a mail exchanged with the counterpart before the mail 627.

As described above, in the state that the screen of the display unit 250 is expanded to the maximum size, the scroll function may be performed according to the operation of pulling the second holder 224.

According to another embodiment of the present invention, the user may find desired information according to the screen expansion, and then may locate the found information next to the main screen.

Figure 13A:
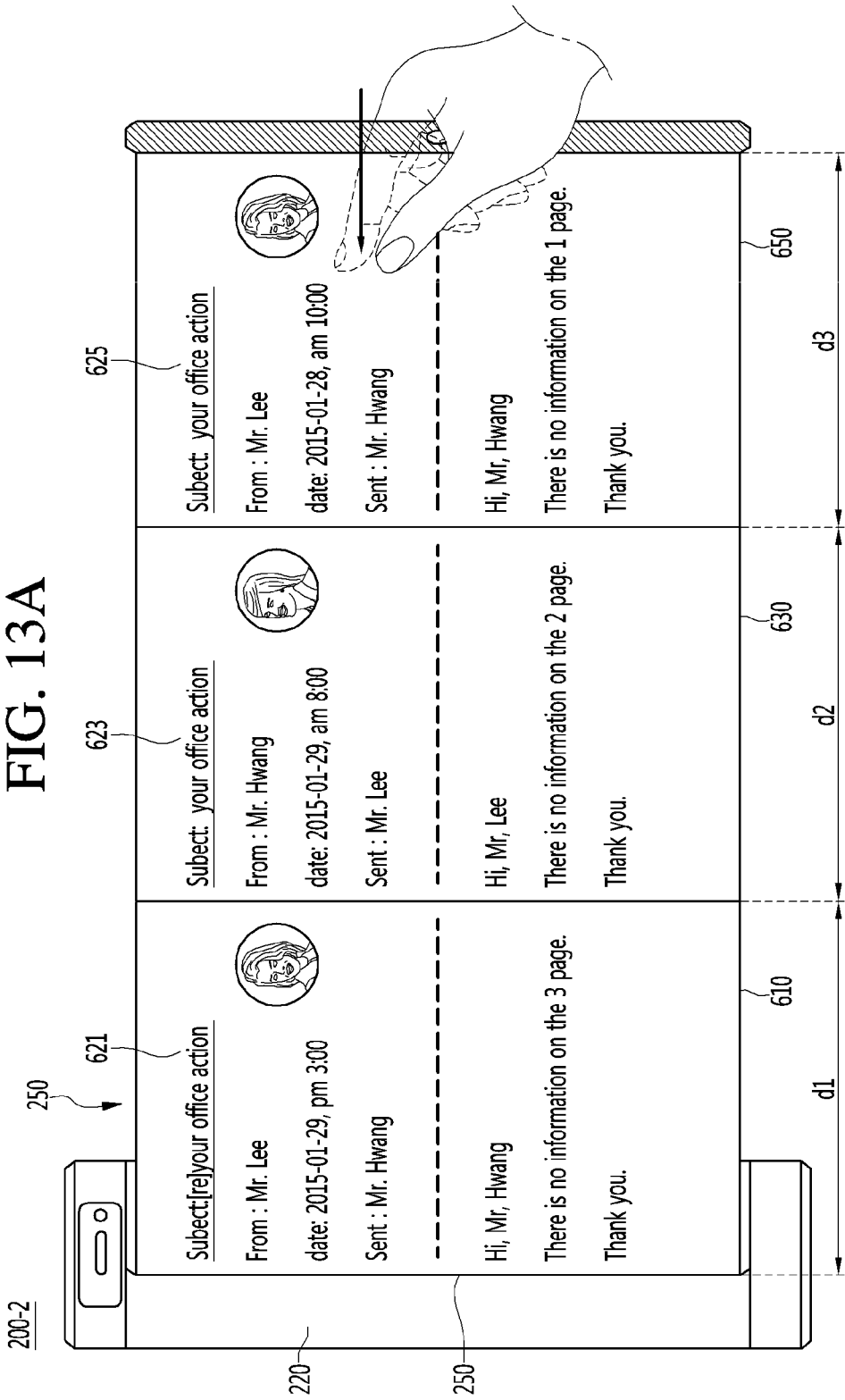
FIGS. 13A and 13B are views illustrating an example of arranging specific information located in an expanded region around a main screen according to an embodiment of the present invention.
Figure 13B:
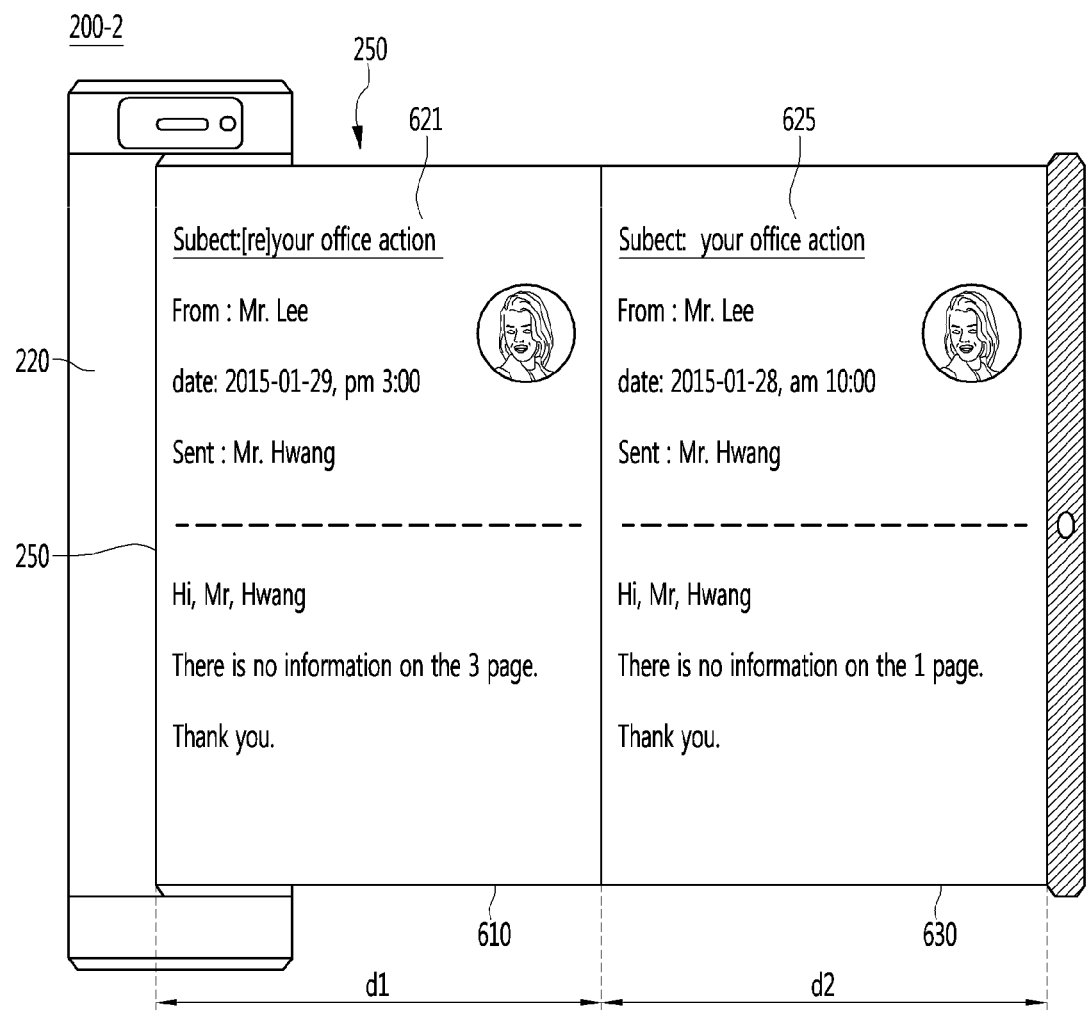

FIGS. 13A and 13B are views illustrating an example of arranging specific information located in an expanded region around a main screen according to an embodiment of the present invention.

FIG. 13A is the same as FIG. 6E, and thus the redundant details thereof will be omitted. In FIG. 13a, it is assumed that the first region 610 is a main screen region. The main screen region may be a region that displayed information is fixed.

When it is detected that the third region 650 or the third mail 625 is selected in FIG. 13A and the screen size of the display unit 250 is reduced to the third region 650 corresponding to the third distance d3, the control unit 290 may display the third mail 625, which has been displayed on the third region 650, on the second region 630 as shown in FIG. 13B. The screen size of the display unit 250 is reduced as the third region 650 is selected. Accordingly, the third mail 625 may be displayed on the second region 630 without disappearing. The user may place the third mail 625 beside the first mail 621 when selecting the third mail 625 and reducing the screen size by the second region 630.

The user may extend the extension, may find the desired information, may locate the found information next to the main region, thereby locating other tasks.

According to another embodiment of the present invention, after the information, which is displayed in the expanded region, is selected, the selected information may be automatically stored or archived as the expanded region is reduced.

Figure 14A:
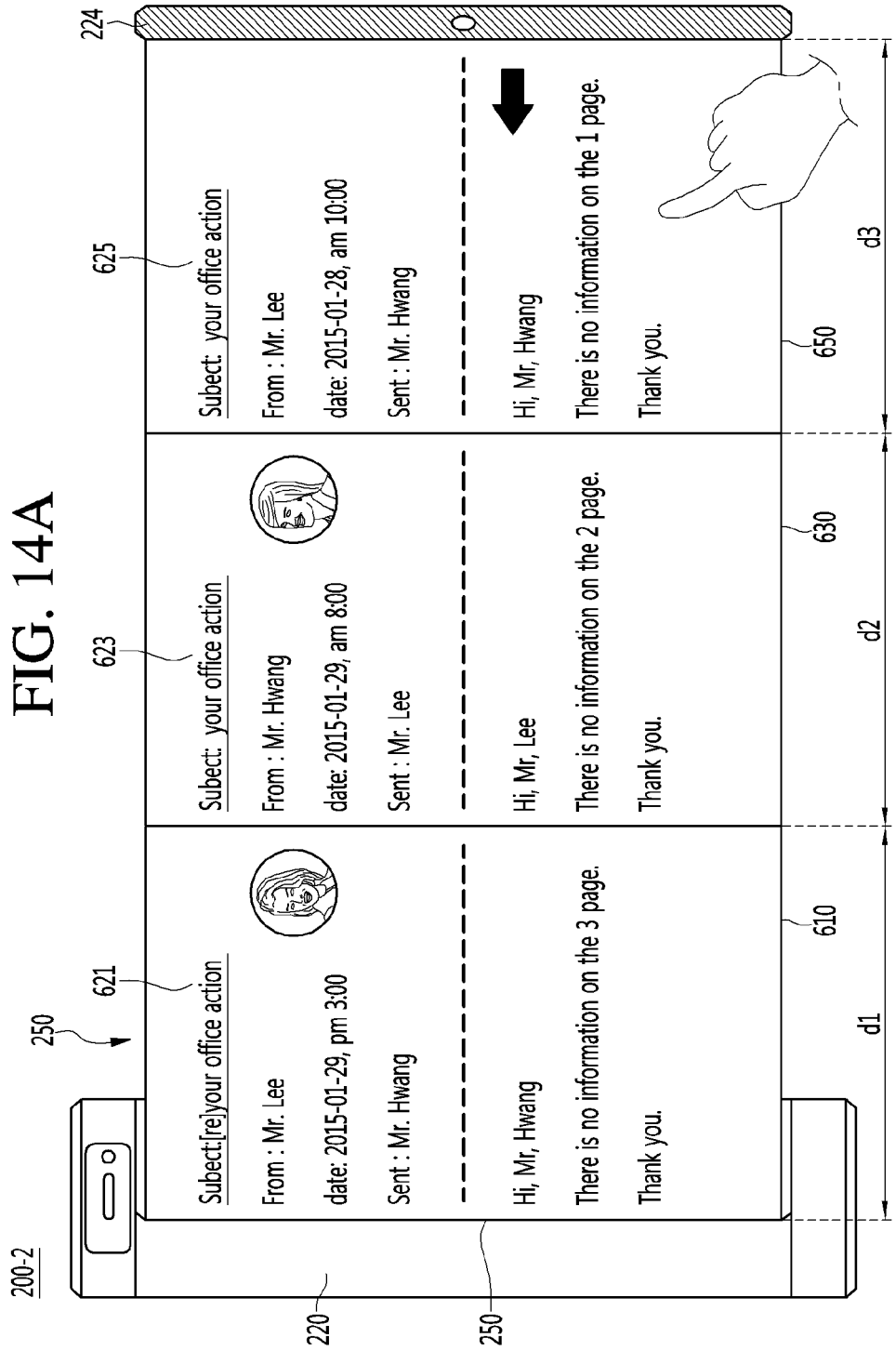
FIGS. 14A and 14B are views illustrating an example of automatically storing or archiving selected information, as an expanded region is reduced after a request to select information displayed on the expanded region is received according to an embodiment of the present invention.
Figure 14B:
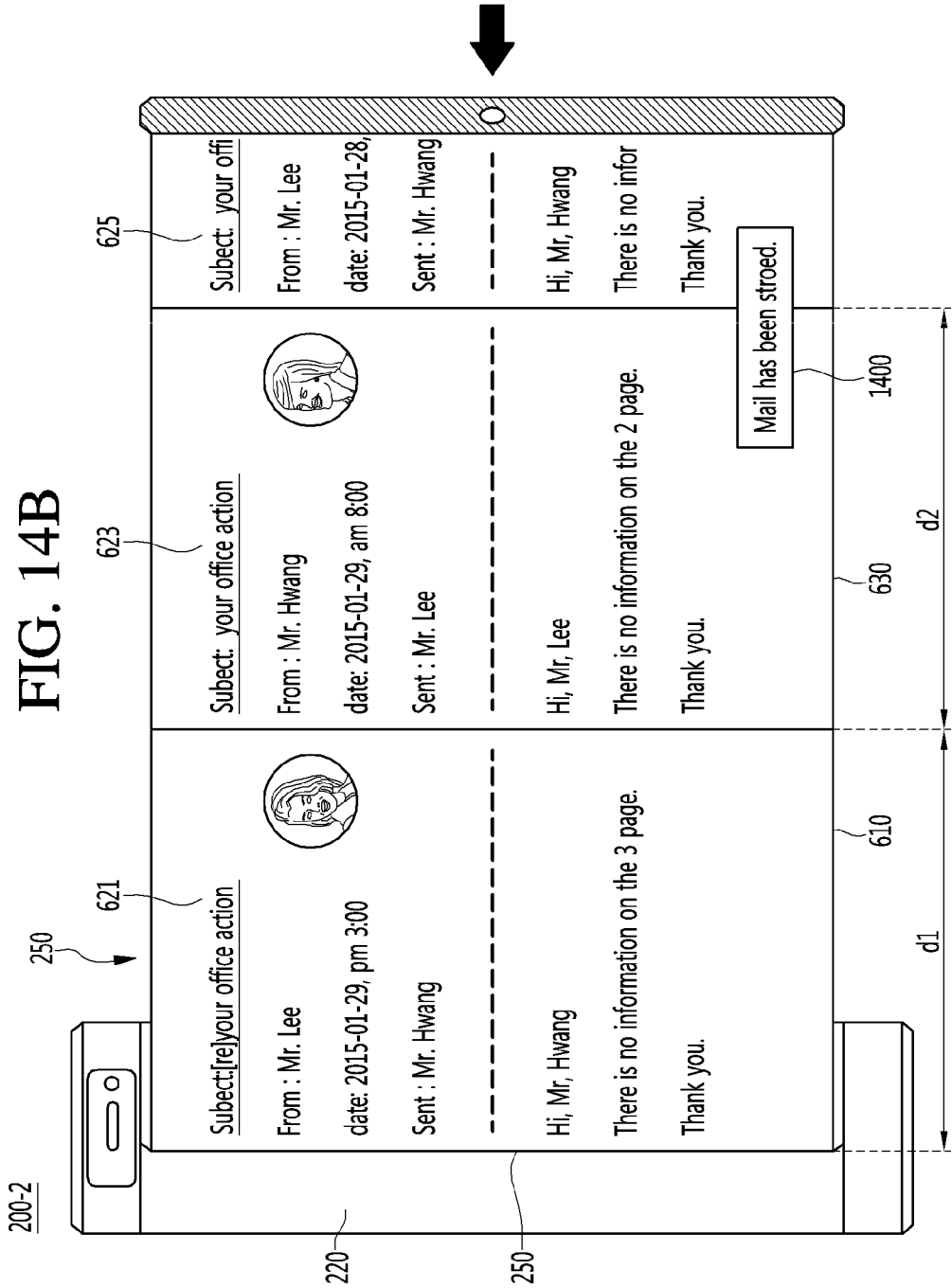

FIGS. 14A and 14B are views illustrating an example of automatically storing or archiving selected information, as an expanded region is reduced after a request to select information displayed on the expanded region is received according to an embodiment of the present invention.

FIG. 14A is the same as FIG. 6E and thus redundant details may be omitted.

In FIG. 14A, when it is detected that the third region 650 is reduced after the request to select the third mail 625 is received, the control unit 290 may or store the third mail 6255 as illustrated in FIG. 14B while displaying a message window 1400 indicating that the third mail 625 is stored or archived.

The user may view the information provided onto each region, may select desired information, and then automatically store and archive the selected information through an operation of folding the screen.

The present invention as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet). Thus, the detailed description should not be construed as limitative in all aspects and should be considered exemplary. The scope of the prevent invention should be defined by the reasonable understanding of the following claims and all changes falling within the equivalent scope of the prevent invention are included in the scope of the prevent invention.

The invention claimed is:

1. A flexible display device comprising:
a display unit configured to display information on a screen, the screen being configured to be expanded or reduced;
a sensing unit configured to sense an expansion or a reduction of the screen; and
a control unit configured to:
display first information on a first region corresponding to a first distance of the screen of the display unit,
expand the screen by a second region corresponding to a second distance,
display, on the second region, second information time-series associated with the first information,
receive a request for selecting an attached-file item included in the second information,
detect the screen is expanded by a third region corresponding to a third distance while receiving the request for selecting the attached-file item, and
display, on the third region, a preview information of the selected attached-file item.

2. The flexible display device of claim 1, wherein the second information is information that is transmitted or received, before the first information is received.

3. The flexible display device of claim 2, wherein the first information is a first mail received from a counterpart, and
wherein the second information is a second mail sent to the counterpart by a user before the first mail is received.

4. The flexible display device of claim 3, wherein each of the first mail and the second mail includes:
at least one of the attached-file item for indicating presence of an attached file, a sender item for identifying a person who sends a mail, and a reply item for replying to the mail.

5. The flexible display device of claim 4, wherein the control unit receives a request to select a sender item included in the first mail and displays, on the second region, another mail sent by a sender corresponding to the selected sender item selected according to the received request.

6. The flexible display device of claim 4, wherein the control unit receives a request to select a reply item included in the first mail and displays, on the second region, a reply mail window for replying to a counterpart having sent the first mail, according to the received request.

7. The flexible display device of claim 6, wherein the first mail includes an attached file, and
wherein the control unit adds the attached file to a reply mail window based on an input of dragging or dropping the attached file into the second region.

8. The flexible display device of claim 1, wherein the control unit sequentially displays other pieces of information, which is not displayed, on the second region when expansion of the screen is detected after a screen size of the display unit is expanded to a maximum size.

9. The flexible display device of claim 8, wherein the control unit maintains the first information to be displayed on the first region while sequentially displaying, on the second region, the other pieces of information which is not displayed.

10. The flexible display device of claim 1, wherein the control unit expands the screen by the third region corresponding to the third distance, and to display, on the third region, third information time-series associated with the second information.

11. The flexible display device of claim 10, wherein the control unit switches the second information, which is displayed on the second region, to the third information, when the third information is selected and the screen is reduced by the third area.

12. The flexible display device of claim 10, wherein the control unit stores the third information when the third information is selected and reduction of the screen is detected.

13. The flexible display device of claim 1, wherein the control unit independently controls the first region and the second region.

* * * * *